US012756062B2

(12) United States Patent
Han et al.

(10) Patent No.: US 12,756,062 B2
(45) Date of Patent: Oct. 6, 2026

(54) BATTERY MODULE AND BATTERY PACK INCLUDING THE SAME

(71) Applicant: SK ON CO., LTD., Seoul (KR)

(72) Inventors: Jeong Woo Han, Daejeon (KR); Hae Ryong Jeon, Daejeon (KR)

(73) Assignee: SK On Co., Ltd., Seoul (KR)

( * ) Notice: Subject to any disclaimer, the term of this patent is extended or adjusted under 35 U.S.C. 154(b) by 843 days.

(21) Appl. No.: 17/988,235

(22) Filed: Nov. 16, 2022

(65) Prior Publication Data

US 2023/0282929 A1 Sep. 7, 2023

(30) Foreign Application Priority Data

Dec. 30, 2021 (KR) ........................ 10-2021-0192794

(51) Int. Cl.

*H01M 50/383* (2021.01)
*H01M 50/211* (2021.01)
*H01M 50/507* (2021.01)

(52) U.S. Cl.

CPC ....... *H01M 50/383* (2021.01); *H01M 50/211* (2021.01); *H01M 50/507* (2021.01)

(58) Field of Classification Search

CPC ............. H01M 50/507; H01M 50/211; H01M 50/204; H01M 50/383; H01M 50/588; H01M 50/658; H01M 50/516

See application file for complete search history.

(56) References Cited

U.S. PATENT DOCUMENTS

| | | | | |
|---|---|---|---|---|
| 2020/0006741 | A1 | 1/2020 | Shin et al. | |
| 2020/0014005 | A1 | 1/2020 | Lee et al. | |
| 2021/0194101 | A1 | 6/2021 | Kim et al. | |
| 2021/0320374 | A1* | 10/2021 | Lee .................. | H01M 10/6566 |
| 2022/0115737 | A1 | 4/2022 | Shin et al. | |
| 2022/0123438 | A1 | 4/2022 | Kim et al. | |

FOREIGN PATENT DOCUMENTS

| | | | |
|---|---|---|---|
| KR | 10-2018-0099438 | A | 9/2018 |
| KR | 10-2019-0124022 | A | 11/2019 |
| KR | 10-2055424 | B1 | 12/2019 |
| KR | 10-2097087 | B1 | 3/2020 |
| KR | 10-2117859 | B1 | 6/2020 |
| KR | 10-2021-0004189 | A | 1/2021 |
| KR | 10-2021-0015547 | A | 2/2021 |
| KR | 10-2021-0065268 | A | 6/2021 |
| KR | 10-2466707 | B1 | 11/2022 |
| KR | 10-2023-0009709 | A | 1/2023 |

* cited by examiner

*Primary Examiner* — Karie O'Neill Apicella
(74) *Attorney, Agent, or Firm* — IP&T GROUP LLP

(57) ABSTRACT

A battery module and a battery pack are provided, a battery module including a cell stack including a plurality of battery cells; a housing including an internal space to accommodate the cell stack; a plurality of electrically conductive connectors electrically connected to the plurality of battery cells, a support frame arranged to face at least one side surface of the cell stack and supporting the plurality of electrically conductive connectors; an insulation cover disposed between the support frame and the housing; and one or more short-circuit prevention members disposed on at least part of the insulation cover to electrically isolate the plurality of electrically conductive connectors from each other.

12 Claims, 15 Drawing Sheets

BATTERY MODULE AND BATTERY PACK INCLUDING THE SAME

CROSS-REFERENCE TO RELATED APPLICATION(S)

This application claims benefit of priority to Korean Patent Application No. 10-2021-0192794 filed on Dec. 30, 2021 in the Korean Intellectual Property Office, the disclosure of which is incorporated herein by reference in its entirety.

TECHNICAL FIELD

The present disclosure relates to a battery module and a battery pack including the same.

BACKGROUND

As the technological development of and demand for a mobile device, an electric vehicle, and an energy storage system (ESS) have increased, demand for a secondary battery as an energy source has rapidly increased. A secondary battery may be repeatedly charged and discharged as mutual conversion between chemical energy and electrical energy is reversible, and types of secondary batteries currently widely used may include a lithium ion battery, a lithium polymer battery, a nickel cadmium battery, a nickel hydride battery, a nickel zinc battery, and the like.

When an output voltage and energy capacity higher than those of a unit secondary battery cell (that is, a battery cell) are required, a battery module or a battery pack may be configured by connecting a plurality of unit secondary battery cells. For example, a battery module or a battery pack may refer to a device in which a plurality of unit secondary battery cells may be connected in series or in parallel and may store or output electrical energy.

In such a battery module or battery pack, an electrical connection between one battery cell and another battery cell may be made through a plurality of conductive busbars electrically connected to the battery cells, respectively. The plurality of busbars may be disposed in the battery module with a predetermined distance (e.g., a safety distance) therebetween such that a small current does not pass therebetween or a short circuit does not occur. A busbar frame may include a non-conductive material (e.g., plastic) having a predetermined degree of rigidity, and may structurally support the plurality of busbars. The plurality of busbars may be fixed to a busbar frame, such that a safety distance between the busbars may be maintained even when external impacts or vibrations are applied.

When an issue such as a short circuit occurs in a portion of battery cells in the battery module and the temperature of the battery cell exceeds a critical temperature, thermal runaway phenomenon may occur. When a high-temperature or high-pressure gas or flame is generated in the battery module due to such thermal runaway phenomenon, a busbar frame, which is relatively vulnerable to heat, may collapse and a safety distance between the busbars may not be maintained.

Also, as the busbar frame collapses and may no longer support the busbars, the distance between the busbars may decrease further than the safe distance, such that an electrical short may occur between the busbars, and there may be a risk of rapid heat transfer to adjacent battery cells, which may lead to accidents such as chain ignition or explosion of the battery cells.

When disposing a plurality of battery cells in the battery module, a heat insulating member may be further provided between the battery cells to delay heat transfer to the other battery cells even when thermal runaway occurs in a portion of the battery cells. However, even when heat transfer between the battery cells is delayed by the heat insulating member, it may not be possible to prevent an electrical short between the busbars, which may be problematic.

SUMMARY

An aspect of the present disclosure is to provide a battery module which may prevent electrical shorts between busbars even when thermal runaway occurs in a portion of battery cells, and a battery pack including the same.

An aspect of the present disclosure is to provide a battery module which may maintain a gap between busbars even when the busbar frame collapses due to high-temperature or high-pressure gas or flame in the battery module or a battery pack, and a battery pack including the same.

An aspect of the present disclosure is to provide a battery module which may prevent an electrical short between busbars using a short-circuit prevention member, at least a portion of which is inserted into the busbar assembly, and a battery pack including the same.

An aspect of the present disclosure is to provide a battery module which may maintain a distance between busbars using a short-circuit prevention member including a material having a melting point higher than that of a busbar frame, and a battery pack including the same.

According to an aspect of the present disclosure, a battery module and a battery pack are provided, a battery module comprising a cell stack including a plurality of battery cells; a housing including an internal space to accommodate the cell stack; a plurality of electrically conductive connectors electrically connected to the plurality of battery cells; a support frame arranged to face at least one side surface of the cell stack and supporting the plurality of electrically conductive connectors; an insulation cover disposed between the support frame and the housing; and one or more short-circuit prevention members disposed on at least part of the insulation cover to electrically isolate the plurality of electrically conductive connectors from each other.

The short-circuit prevention member may include a material that has a property that prevents or retards a passage of excessive heat or flames, wherein the property includes at least one of heat resistance, flame retardancy, or heat insulation.

The one or more short-circuit prevention members may include a material having a melting point higher than a melting point of a material that constitutes at least part of the support frame.

The one or more short-circuit prevention members may include mica, ceramic wool, aerogel, or a combination of two or more of mica, ceramic wool, and aerogel.

At least a portion of the one or more short-circuit prevention members may be disposed between two electrically conductive connectors adjacent to each other among the plurality of electrically conductive connectors.

The insulation cover may be disposed to face the support frame, and the insulation cover further includes an insertion groove into which at least a portion of the one or more short-circuit prevention members is inserted.

The short-circuit prevention member may be attached to the insulation cover.

The support frame may include an accommodation groove in which at least a portion of the one or more short-circuit prevention members is accommodated.

The one or more short-circuit prevention members may include one or more first short-circuit preventing members and one or more second short-circuit prevention members, at least a portion of the one or more first short-circuit preventing members is disposed between two electrically conductive connectors adjacent to each other among the plurality of electrically conductive connectors, and wherein at least a portion of the one or more second short-circuit prevention members penetrates through the plurality of electrically conductive connectors.

The one or more first short-circuit prevention members and the one or more second short-circuit prevention members may be alternately arranged in a stacking direction of the plurality of battery cells.

At least one of the plurality of battery cells may include a lead tab, wherein at least one of the plurality of electrically conductive connectors includes a slit opening, and wherein the lead tab is inserted to the slit opening and is electrically connected to at least one of the plurality of electrically conductive connectors.

At least one of the plurality of battery cells may include a lead tab electrically connected to at least one of the plurality of electrically conductive connectors, and wherein at least a portion of the lead tab is bent toward a surface of at least one of the plurality of electrically conductive connectors.

A battery module, comprising a cell stack including a plurality of battery cells that are stacked on top of one another; a plurality of busbars electrically connected to the plurality of battery cells; a busbar frame having a first surface arranged to face at least one side surface of the cell stack and supporting the plurality of busbars; and one or more short-circuit prevention members disposed on at least part of the busbar frame to electrically isolate the plurality of busbars from each other, wherein the one or more short-circuit prevention members include a material having a melting point higher than a melting point of a material that constitutes at least part of the busbar frame.

The one or more short-circuit prevention members may include mica, ceramic wool, aerogel, or a combination of two or more of mica, ceramic wool, and aerogel.

The one or more short-circuit prevention members may be disposed between two busbars adjacent to each other among the plurality of busbars.

The plurality of busbars and the one or more short-circuit prevention members may be alternately disposed on the busbar frame in a stacking direction of the plurality of battery cells.

The battery module may further comprise an insulation cover disposed to face a second surface opposite to the first surface of the busbar frame, wherein ends of the one or more short-circuit prevention members protrude from the plurality of busbars toward the insulation cover.

The busbar frame may further include one or more insertion grooves into which the one or more short-circuit prevention members are inserted, and wherein the one or more insertion grooves include an inner surface that includes a protruding area structured to fasten the one or more short-circuit prevention members in the one or more insertion grooves.

The one or more short-circuit prevention members may be attached to the busbar frame.

A battery pack may comprise a plurality of the battery modules, wherein at least one of the battery modules includes a cell stack including a plurality of battery cells that are stacked on top of one another; a plurality of busbars electrically connected to the plurality of battery cells; a busbar frame having a first surface arranged to face at least one side surface of the cell stack and supporting the plurality of busbars; and one or more short-circuit prevention members disposed on at least part of the busbar frame to electrically isolate the plurality of busbars from each other, wherein the one or more short-circuit prevention members include a material having a melting point higher than a melting point of a material that constitutes at least part of the busbar frame.

BRIEF DESCRIPTION OF DRAWINGS

The above and other aspects, features, and advantages of the present disclosure will be more clearly understood from the following detailed description, taken in conjunction with the accompanying drawings, in which.

DETAILED DESCRIPTION

Figure 1:
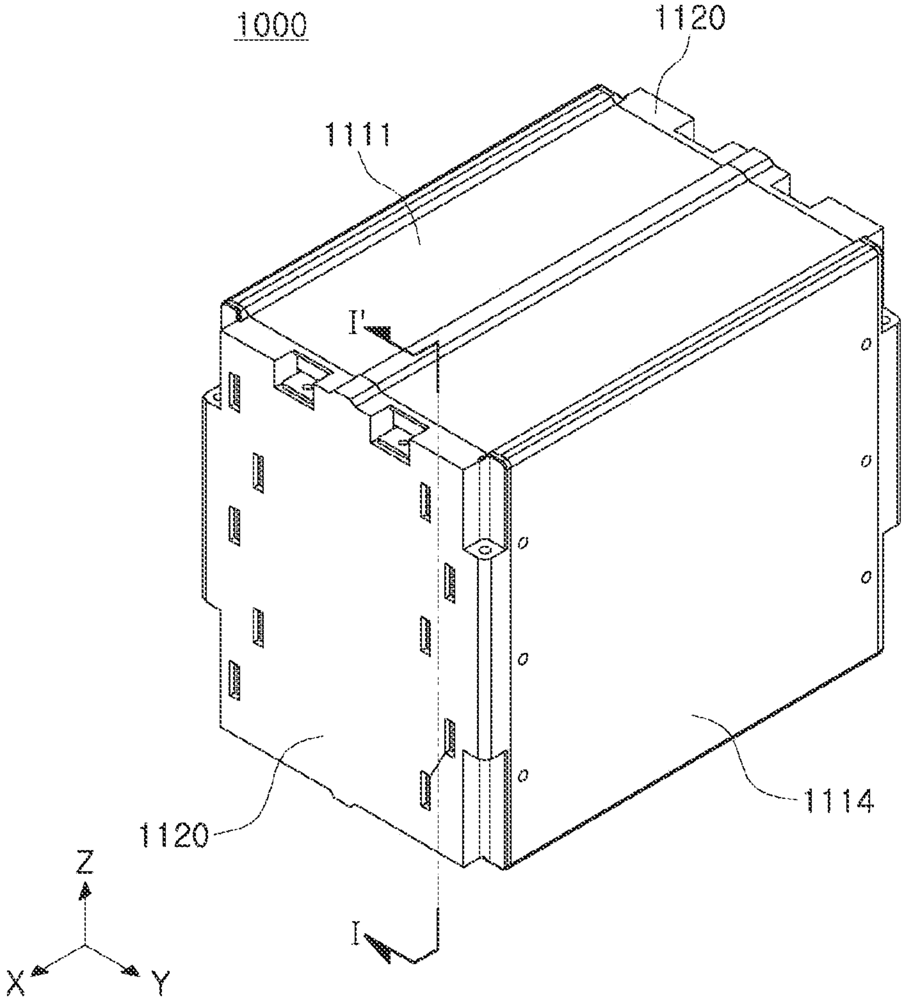
FIG. 1 is a perspective diagram illustrating a battery module according to an example embodiment of the present disclosure.

Hereinafter, embodiments of the present disclosure will be described as follows with reference to the attached drawings.

The present disclosure may, however, be exemplified in many different forms and should not be construed as being limited to the specific embodiments set forth herein. Rather, these embodiments are provided such that this disclosure will be thorough and complete, and will fully convey the scope of the disclosure to those skilled in the art. Accordingly, shapes and sizes of the elements in the drawings may be exaggerated for clarity of description.

An expression used in the singular encompasses the expression of the plural, unless it has a clearly different meaning in the context, and elements having the same function within the scope of the same concept represented in the drawing of each example embodiment will be described using the same reference numeral.

Also, in the example embodiments, expressions such as "upper side," upper portion, lower side, lower portion, side surface, front surface, rear surface, and the like, are based on the directions illustrated in the drawings, and may be represented differently when the direction of the corresponding object changes.

The terms including ordinal number such as "first," "second," and so on may be used in the description and the claims to distinguish the elements from one another. These terms are used only for the purpose of differentiating one component from another, without limitation thereto.

Figure 2:
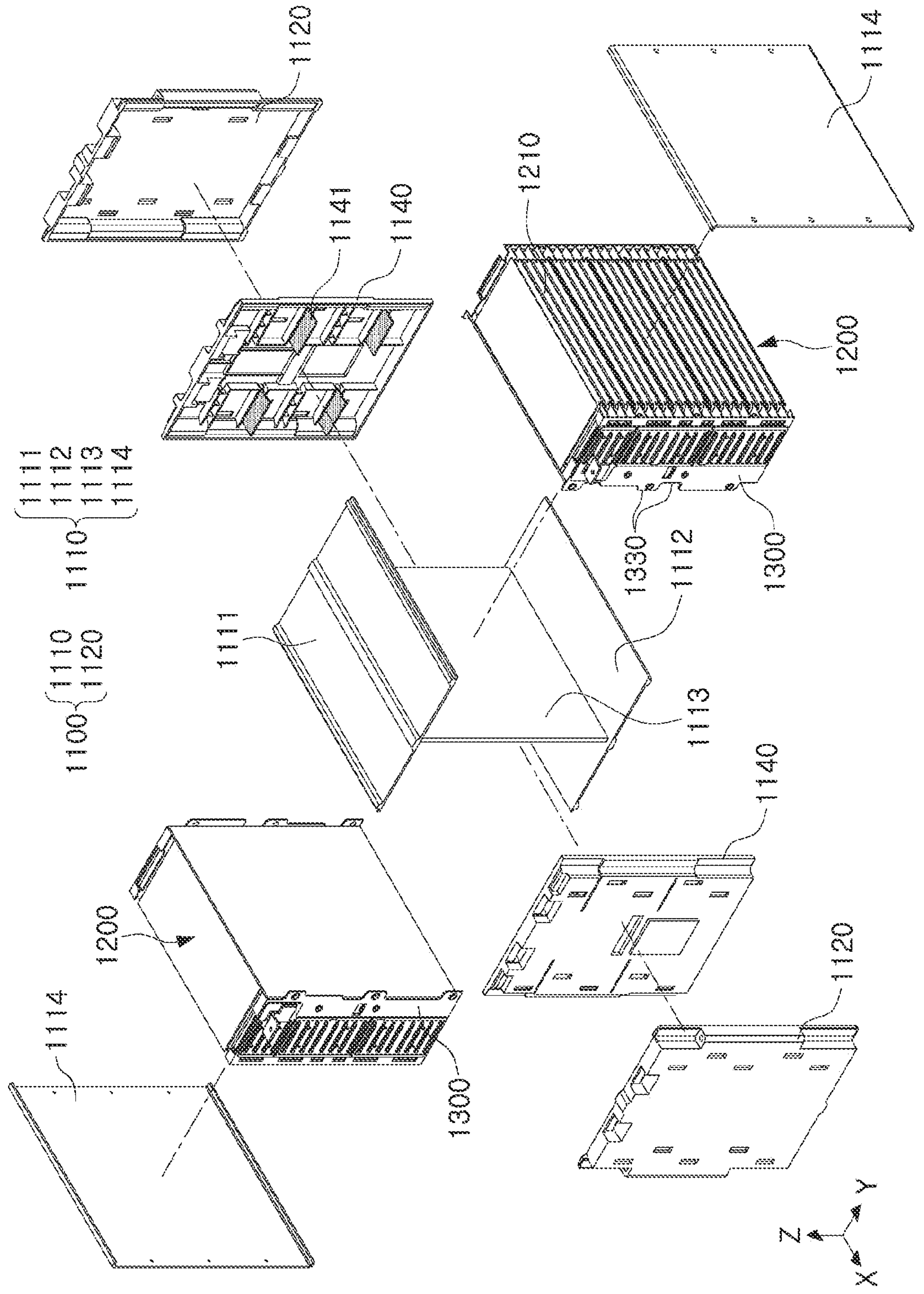
FIG. 2 is an exploded perspective diagram illustrating a battery module according to an example embodiment of the present disclosure.

FIG. 1 is a perspective diagram illustrating a battery module 1000 according to an example embodiment. FIG. 2 is an exploded perspective diagram illustrating a battery module 1000 according to an example embodiment.

The battery module 1000 may include a cell stack 1200 including a plurality of battery cells 1210, a busbar assembly 1300 electrically connected to the cell stack 1200, a housing 1100 in which the 1200 is accommodated, and an insulation cover 1140 disposed between the housing 1100 and the cell stack 1200.

The housing 1100 may include a module frame 1110 including an internal space in which the cell stack 1200 is accommodated, and an end plate 1120 coupled to the module frame 1110. For example, as illustrated in FIG. 2, the housing 1100 may include a module frame 1110 including an upper plate 1111, a lower plate 1112, and a pair of side plates 1114, and a pair of end plates 1120 for closing the open both ends of the module frame 1110.

The housing 1100 may be formed of a material having a predetermined degree of rigidity to protect the cell stack 1200 and other electrical components from external impacts. For example, the housing 1100 may include a metal material such as aluminum.

One or more cell stacks 1200 may be accommodated in the internal space of the housing 1100. For example, as illustrated in FIG. 2, a plurality of cell stacks 1200 may be accommodated in the internal space of the housing 1100.

The housing 1100 may further include a partition wall 1113 disposed between the plurality of cell stacks 1200 and partitioning an internal space. For example, as illustrated in FIG. 2, the housing 1100 may include the partition wall 1113 connected to at least one of the upper plate 1111 and the lower plate 1112 and partitioning an internal space. The upper plate 1111, the lower plate 1112, and the partition wall 1113 may be integrated with each other, and accordingly, the module frame 1110 may include an "I"-shaped frame. When the module frame 1110 includes an "I"-shaped frame, at least one cell stack 1200 may be disposed on both side surfaces of the partition wall 1113, respectively. However, the structure of the housing 1100 is not limited to the above example, and may have any shape as long as the housing 1100 may have an internal space in which at least one cell stack 1200 may be accommodated. That is, the shape illustrated in FIG. 2 is only an example, and the module frame 1110 may have various shapes. For example, the module frame 1110 may have a U-shaped frame in which the lower plate 1112 and the side plate 1114 are integrated with each other, or may have an integral mono-frame having open front and rear surfaces.

The cell stack 1200 included in the battery module 1000 may be formed by stacking a plurality of battery cells 1210 and a plurality of protective members. The protective member may include various types of members, such as a compressible pad for preventing the battery cell 1210 from swelling, and an insulating sheet for blocking thermal runaway transfer between battery cells 1210 adjacent to each other.

The plurality of battery cells 1210 and the plurality of protective members may be stacked in various directions and may form the cell stack 1200. For example, as illustrated in FIG. 2, the plurality of battery cells 1210 and the plurality of protective members may be stacked in a direction perpendicular to the lower plate 1112 of the housing 1100. However, FIG. 2 illustrates only an example, and the plurality of battery cells 1210 and the plurality of protective members may be stacked on the lower plate 1112 of the housing 1100 in a horizontal direction.

The battery module 1000 may include one or more cell stacks 1200. When a plurality of cell stacks 1200 are disposed, the plurality of cell stacks 1200 may be disposed in the housing 1100 in various manners. For example, as illustrated in FIG. 2, the plurality of cell stacks 1200 may be arranged side by side on the lower plate 1112 of the housing 1100 in a horizontal direction and may be electrically connected to each other. Alternatively, the plurality of cell stacks 1200 may be arranged side by side in a direction (e.g., the Y-axis direction in FIG. 2) perpendicular to the direction (e.g., the Z-axis direction in FIG. 2) in which the battery cells 1210 are stacked.

A plurality of battery cells 1210 included in the cell stack 1200 may be electrically connected to each other by busbars of the busbar assembly 1300. In implementations, each busbar may be an electrically conductive bar or connector that is made of an electrically conductive material such as a metal or metal alloy. When the plurality of cell stacks 1200 are disposed, a plurality of the busbar assemblies 1300 may also be disposed and may be electrically connected to each of the cell stacks 1200. For example, as illustrated in FIG. 2, the plurality of cell stacks 1200 may be coupled to each other while being connected to different busbar assemblies 1300, respectively. For the accuracy and convenience of coupling, the busbar assembly 1300 may include a coupling guide portion 1330 having an uneven shape engaging with an adjacent busbar assembly 1300. However, FIG. 2 illustrates only an example, and the plurality of cell stacks 1200 may be connected to the busbar assemblies 1300 integrated with each other.

Although not illustrated, the battery module 1000 may further include a sensing module (not illustrated) connected to the busbar assembly 1300. The sensing module (not illustrated) may include a temperature sensor or a voltage sensor, and may detect the state of the battery cell 1210.

The battery module 1000 may include an insulation cover 1140. For example, as illustrated in FIG. 2, the insulation cover 1140 may be disposed between the end plate 1120 and the busbar assembly 1300. The insulation cover 1140 may include an insulating material, thereby preventing electrical connection between the cell stack 1200 and the housing 1100. For example, the insulation cover 1140 may be formed of a plastic injection material including polypropylene or modified polyphenylene oxide (MPPO). As the insulation cover 1140 is disposed, an electrical short between the cell stack 1200 and the housing 1100 or between the busbar and the housing 1100 may be prevented.

Figure 3:
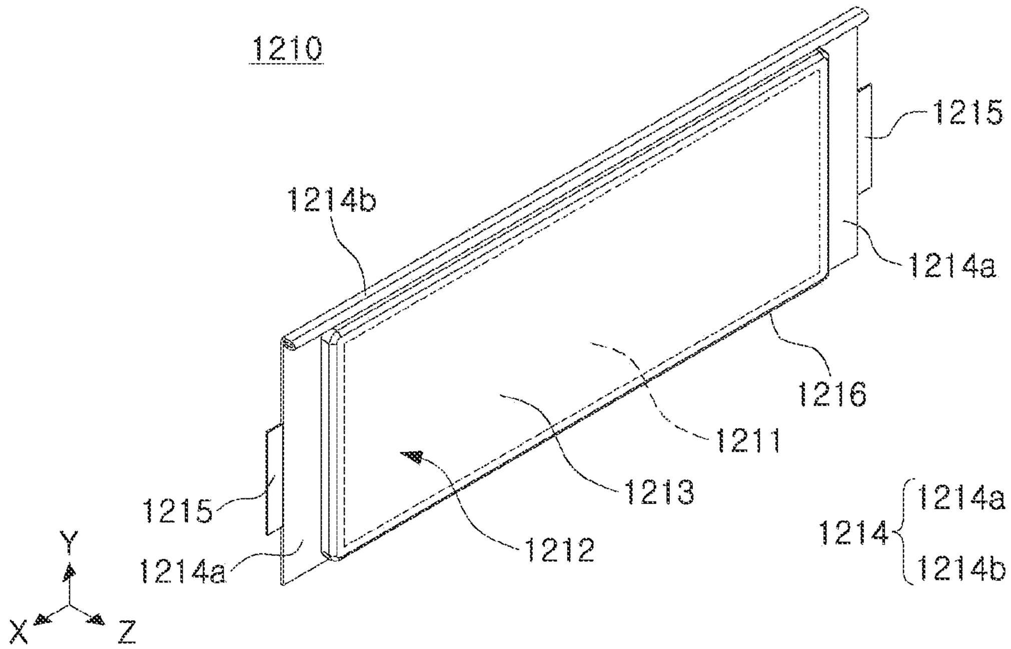
FIG. 3 is a perspective diagram illustrating a battery cell included in a battery module according to an example embodiment of the present disclosure.

FIG. 3 is a perspective diagram illustrating a battery cell 1210 included in a battery module according to an example embodiment. Since the battery cell 1210 described in FIG.

3 may be similar to the battery cell 1210 described in FIGS. 1 to 2, overlapping descriptions will not be provided.

The cell stack 1200 may include one or more battery cells 1210. The battery cell 1210 may be configured to convert chemical energy into electrical energy and may supply power to an external circuit, or to receive power from an external entity, to convert electrical energy into chemical energy and to store electricity. For example, the battery cell 1210 may include a nickel metal hydride (Ni-MH) battery or a lithium ion (Li-ion) battery for charging and discharging. A plurality of battery cells 1210 may be stacked side by side, may be connected in series or parallel to each other, and may form the cell stack 1200.

The plurality of battery cells 1210 included in the cell stack 1200 may be pouch-type battery cells 1210 as illustrated in FIG. 3.

Referring to FIG. 3, the pouch-type battery cell 1210 may include a cell body 1213 in which the electrode assembly 1211 is accommodated in the pouch 1212, and a plurality of lead tabs 1215 electrically connected to the electrode assembly 1211 and exposed externally of the pouch 1212.

The electrode assembly 1211 may include a plurality of internal electrode plates. Here, the internal electrode plate may include a positive electrode plate (not illustrated) and a negative electrode plate (not illustrated), and the electrode assembly 1211 may have a form in which a positive electrode plate (not illustrated) and a negative electrode plate (not illustrated) may be stacked with a separator (not illustrated) interposed therebetween. An internal electrode tab (not illustrated) may be disposed on each of the plurality of positive plates (not illustrated) and the plurality of negative plates (not illustrated), and the internal electrode tabs (not illustrated) may be connected such that the internal electrode tabs having the same polarity may be in contact with each other. The internal electrode tabs (not illustrated) having the same polarity may be electrically connected to each other and may be electrically connected to the outside of the pouch 1212 through the lead tab 1215. As for the battery cell 1210 illustrated in FIG. 3, the two lead tabs 1215 may be disposed to be directed in opposite directions, but the two lead tabs 1215 may be disposed to be directed in the same direction and may have different lengths or heights.

The pouch 1212 may surround the electrode assembly 1211, may form an exterior of the cell body 1213, and may provide an internal space in which the electrode assembly 1211 and an electrolyte (not illustrated) are accommodated. The pouch 1212 may accommodate the electrode assembly 1211 therein, and may have an internal space corresponding to the shape of the electrode assembly 1211.

The pouch 1212 may be formed by folding a single sheet of exterior material. For example, the pouch 1212 may be configured in a form in which a sheet of exterior material is folded in half, and an internal space in which the electrode assembly 1211 is accommodated may be formed therebetween. The exterior material may be an aluminum laminated film.

A sealing portion 1214 may be formed by bonding an exterior material to an edge of the pouch 1212. A thermal fusion method may be used for bonding the exterior material for forming the sealing portion 1214, but an example embodiment thereof is not limited thereto.

The sealing portion 1214 may be divided into a first sealing portion **1214*a* formed in a position in which the lead tab 1215 is disposed, and a second sealing portion 1214*b* formed in a position in which the lead tab 1215 is not disposed. To increase bonding reliability of the sealing portion 1214 and to reduce the area of the sealing portion 1214, a portion of the sealing portion 1214 may be formed in a folded shape at least once. For example, as illustrated in FIG. 3, the second sealing portion 1214*b* may be folded twice or more and may be fixed by an adhesive member. In this case, an adhesive member may be filled in the second sealing portion 1214*b*, and the shape of the second sealing portion 1214*b***, folded a plurality of times, may be maintained by the adhesive member. The adhesive member may be formed of an adhesive having high thermal conductivity. The adhesive member may be formed of epoxy or silicone, but an example embodiment thereof is not limited thereto.

The sealing portion 1214 may not be formed on the surface on which the pouch 1212 is folded along one edge of the electrode assembly 1211. A portion in which the pouch 1212 is folded along one edge of the electrode assembly 1211 may be defined as a folding portion 1216 to distinguish the portion from the sealing portion 1214. That is, the pouch 1212 of the battery cell 1210 may have a three-sided sealing pouch form in which the sealing portion 1214 may be formed on three of the four edge surfaces of the pouch 1212, and the folding portion 1216 may be formed on the other surface. In the specific example illustrated in FIG. 3, there two second sealing portions **1214*b* formed on opposite sides of the pouch 1212 where the two opposing lead tabs 1215** are located.

However, the battery cell 1210 is not limited to the three-sided sealing pouch form illustrated in FIG. 3. For example, a pouch may be formed by overlapping two different exterior materials, and a sealing portion may be formed on four surfaces on the periphery of the pouch. For example, the sealing portion may include a sealing portion on two surfaces on which the lead tab is disposed, and a scaling portion on the other two surfaces on which the lead tab is not disposed.

In the above description, the example in which a pouch-type battery cell is used as the battery cell 1210 is described, but the battery cell 1210 is not limited to the aforementioned pouch-type battery cell, and may be configured as a can-type battery cell. For example, the can-type battery cells may have a quadrangular plane to be stacked and to form the cell stack 1200. In a can-type battery cell having a rectangular plane, each electrode may be disposed on a side surface of the battery cell and may be connected to the busbar assembly 1300.

In the description below, a cell block including the cell stack 1200 and the busbar assembly 1300 will be described with reference to FIG. 4.

The cell stack 1200 and the busbar assembly 1300 may be combined with each other and may form a cell block. One or more cell blocks may be disposed in one battery module 1000. When a plurality of cell blocks are disposed, the busbar assembly 1300 included in one of the cell blocks and the busbar assembly 1300 included in another cell block may be configured and may be electrically connected to each other. For example, the battery module may further include a connection member (not illustrated) electrically connecting two cell blocks adjacent to each other to each other.

The cell stack 1200 may further include various types of protective members 1220 and 1230 in addition to the battery cell 1210. For example, as illustrated in FIG. 4, the cell stack 1200 may be formed by stacking a plurality of battery cells 1210, a plurality of compression pads 1220, and a plurality of insulating sheets 1230. However, the cell stack 1200 illustrated in FIG. 4 is merely an example, and the cell stack 1200 may further include other types of protective members in addition to the compression pad 1220 and the heat insulating sheet 1230.

A plurality of compression pads 1220 may be stacked together with the battery cell 1210. The compression pad 1220 may be disposed to oppose the battery cell 1210. The compression pad 1220 may protect the battery cell 1210 from external impact or may absorb expansion pressure according to the expansion of the battery cell 1210. Accordingly, expansion of thickness due to swelling of the battery cell 1210 may be prevented such that changes in the exterior shape of the cell stack 1200 may be reduced, and deterioration of performance of the battery cell 1210 due to the swelling phenomenon may be prevented. To this end, the compression pad 1220 may include a material for absorbing expansion pressure of the battery cell 1210, such as, for example, a polyurethane-based material.

A plurality of heat insulating sheets 1230 may be stacked together with the battery cell 1210. The insulating sheet 1230 may be disposed to oppose at least one of the battery cell 1210 and the compression pad 1220. The heat insulating sheet 1230 may prevent a flame or high-temperature thermal energy from spreading between the neighboring battery cells 1210, thereby preventing a chain ignition in the cell stack 1200. To this end, the heat insulating sheet 1230 may include a material having at least one or more properties among flame retardancy, heat resistance, heat insulation, and insulating properties. Here, heat resistance may refer to properties in which an object does not melt and a shape thereof may not change, and thermal insulation may refer to properties in which a thermal conductivity is 1.0 W/mK or less. For example, the insulating sheet 1230 may be formed of at least a portion of a material of mica, silicate, graphite, alumina, ceramic wool, and Aerogel for performing a function of preventing heat and/or flame transfer. However, the material of the heat insulating sheet 1230 is not limited thereto, and the heat insulating sheet 1230 may be formed of any material which may prevent heat or flame from spreading to the other adjacent battery cells 1210.

A plurality of the compression pads 1220 or a plurality of the heat insulating sheets 1230 may be disposed in the cell stack 1200, and may be disposed between neighboring battery cells 1210 or on the edge of the cell stack 1200. However, the position of the compression pad 1220 or the heat insulating sheet 1230 is not limited to the above-mentioned example, and may be appropriately disposed in the battery module if desired.

Figure 4:
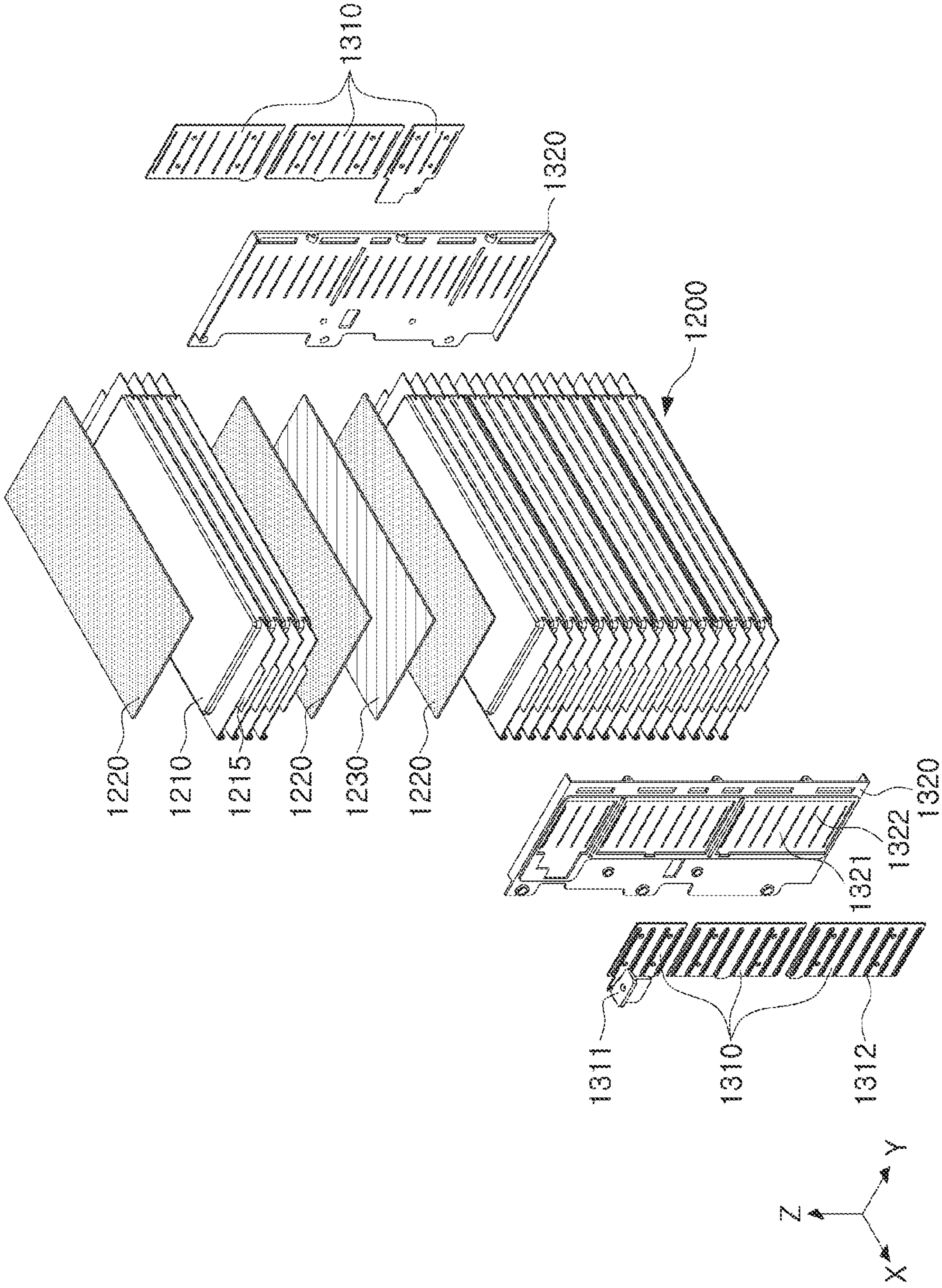
FIG. 4 is an exploded perspective diagram illustrating a cell block included in a battery module according to an example embodiment of the present disclosure.

In the cell stack 1200 illustrated in FIG. 4, the compression pad 1220, four battery cells 1210, the compression pad 1220, and the heat insulation sheet 1230 may be stacked in order, but the stacking order of the components (that is, the battery cells and various pads) included in the cell stack 1200 may be appropriately changed, and is not limited thereto.

A plurality of battery cells 1210 included in the cell stack 1200 may be electrically connected to each other by a busbar assembly 1300. The busbar assembly 1300 may include a support frame as busbar frame 1320 disposed to oppose the cell stack 1200 and a plurality of electrically conductive connectors or busbars 1310 disposed on the support frame or busbar frame 1320 and electrically connected to at least a portion of the plurality of battery cells 1210.

In the example in FIG. 4, each electrically conductive connector or busbar 1310 may be formed of a conductive material, and may electrically connect the plurality of battery cells 1210 to each other. The busbar frame 1320 may support the busbar 1310 to be stably connected to the battery cell 1210. The busbar 1310 may be electrically connected to the battery cell 1210 while being fixed to the busbar frame 1320. For example, as illustrated in FIG. 4, one surface of the busbar frame 1320 may be disposed to cover the cell stack 1200, and a plurality of busbars 1310 may be fixed to the other surface of the busbar frame 1320 while being electrically connected to the battery cell 1210.

The busbar frame 1320 may structurally fix the busbar 1310 while external impact or vibration is applied. For example, the busbar frame 1320 is an electrically insulating frame which may include, in some implementations, an electrically insulating material (having excellent mechanical strength, such as a light plastic material which may include, for example, polybutylene terephthalate (PBT) and modified polyphenylene oxide (MPPO), and accordingly, the busbar frame 1320 may provide electrical insulation and may structurally support the busbar 1310.

A plurality of the busbars 1310 may be arranged side by side in the stacking direction of the battery cells 1210. For example, as illustrated in FIG. 4, the plurality of busbars 1310 may be disposed on a seating portion 1321 formed on the busbar frame 1320 side by side with a predetermined distance in the stacking direction of the battery cells 1210. The busbar frame 1320 may structurally support the busbar 1310 and may maintain a predetermined distance. Since the busbar frame 1320 is formed of an insulating material, the plurality of busbars 1310 fixed with a predetermined distance may be electrically isolated from each other.

The busbar 1310 may be coupled to the busbar frame 1320 in various manners. For example, the busbar 1310 may be fixed to the busbar frame 1320 by a thermal fusion process or an insert injection process.

The lead tab 1215 of the battery cell 1210 may be inserted into the slit opening 1312 of the busbar 1310 and may be electrically connected to the busbar 1310. For example, at least a portion of the lead tab 1215 of the battery cell 1210 may be configured to penetrate through the slit opening 1312 of the busbar 1310, may be bonded to the slit opening 1312 of the busbar 1310 by a process such as laser welding, and may be electrically connected to the busbar 1310. In this case, a slit opening 1322 (hereinafter, referred to as a second slit opening) may also be provided in the busbar frame 1320 in a position corresponding to the slit opening 1312 (hereinafter, referred to as a first slit opening) of the busbar 1310. Accordingly, the lead tab 1215 of the battery cell 1210 may penetrate through both the first slit opening 1312 and the second slit opening 1322 and may be connected to the busbar assembly 1300.

A portion of the plurality of busbars 1310 may have a connection terminal 1311 used for electrical connection to an external entity, and the connection terminal 1311 may be exposed externally of the housing (e.g., 1100 in FIG. 2) to be electrically connected to an external device.

When a thermal runaway situation occurs in the battery cells 1210 included in the cell stack 1200, high-temperature thermal energy, gas, or flame may be generated in the cell stack 1200. Accordingly, the busbar assembly 1300 adjacent to the cell stack 1200 may also be exposed to a high temperature environment. When the internal temperature of the busbar assembly 1300 increases above a predetermined level, a material forming the busbar assembly 1300 may be deformed. For example, when the busbar frame 1320 includes a material deformed at a high temperature such as 200 degrees Celsius or more in some implementations, and when the battery cell 1210 ignites, the busbar frame 1320 may melt and may no longer structurally support the busbar 1310. In this case, any two busbars 1310 adjacent to each other may be in contact with each other such that electrical shorts may occur, which may cause a chain ignition of the cell stack 1200. In particular, when the busbars 1310 are arranged side by side in the direction of gravity (e.g., the Z-axis direction in FIG. 4) in the battery module, the busbars 1310 may move in the direction of gravity (e.g., the Z-axis direction in FIG. 4) according to the collapse of the busbar frame 1320, and the risk of a short circuit between the busbars 1310 may increase. To prevent this, the battery module 1000 may further include an electrical insulation member as a short-circuit prevention member 1141 for preventing a short circuit between the busbars 1310 even in a high temperature environment such as thermal runaway.

The short-circuit prevention member 1141 may be a plate-shaped member formed of a material having at least one or more of flame retardancy, heat resistance, heat insulation, or electrical insulation. Here, heat resistance may refer to properties in which an object does not melt 300 degrees Celsius or more in some at a certain elevated temperature (for example, implementations) and a shape thereof may not change, and thermal insulation may refer to a low thermal conductivity which may be 1.0 W/mK or less. Flame retardancy may refer to properties of preventing or inhibiting self-combustion when a fire source is removed, and For example, flame retardancy may refer to a grade of V-0 or higher in UL94 V Test. Insulation may refer to properties in which it may be difficult to transmit electricity, which may, for example, refer to a material belonging to a comparative tracking index (CTI) II group of 400V or higher in a 400V battery pack (or module) system. For example, the short-circuit prevention member 1141 may include at least a portion of a material selected from among mica, silicate, graphite, alumina, ceramic wool, and Aerogel. However, the material of the short-circuit prevention member 1141 is not limited to the above examples, and the short-circuit prevention member 1141 may be formed of any material maintaining a shape thereof in the case that thermal runaway occurs in the battery cell 1210.

The short-circuit prevention member 1141 may include a material having a melting point higher than the busbar frame 1320. Accordingly, even when the temperature in the battery module 1000 increases and the busbar frame 1320 start melting in the case that thermal runaway occurs, the short-circuit prevention member 1141 may maintain an original shape thereof.

The short-circuit prevention member 1141 may be disposed to be coupled to the insulation cover 1140 or to be inserted into the busbar frame 1320. For example, as illustrated in FIG. 2, the short-circuit prevention member 1141 may be formed as a rectangular plate-shaped member, one end may be coupled to the insulation cover 1140, and the other end may be disposed to oppose the cell stack in the insulation cover 1140. In this case, the other end of the short-circuit prevention member 1141 may be disposed between two busbars 1310 adjacent to each other. Alternatively, in another example embodiment, the short-circuit prevention member 1141 may be disposed to be fixed to the busbar frame 1320. For example, the short-circuit prevention member 1141 may be inserted into and fixed to the busbar frame 1320.

The short-circuit prevention member 1141 may be disposed to maintain the busbars to be spaced apart from each other. For example, the short-circuit prevention member 1141 may be inserted into the space between the busbars or to penetrate through the busbars, thereby fixing the position of the busbars during thermal runaway.

As such, the short-circuit prevention member 1141 may be disposed on one of the insulation cover 1140 and the busbar assembly 1300 and may prevent an electrical short circuit between the busbars 1310 during thermal runaway. Accordingly, the short-circuit prevention member 1141 may prevent an electrical short circuit between the busbars 1310 during thermal runaway such that the battery module may maintain an electrically stable structure.

Hereinafter, the battery module 1000 including the short-circuit prevention member 1141 disposed on the insulation cover 1140 will be described in greater detail with reference to FIGS. 5 to 10.

Figure 5:
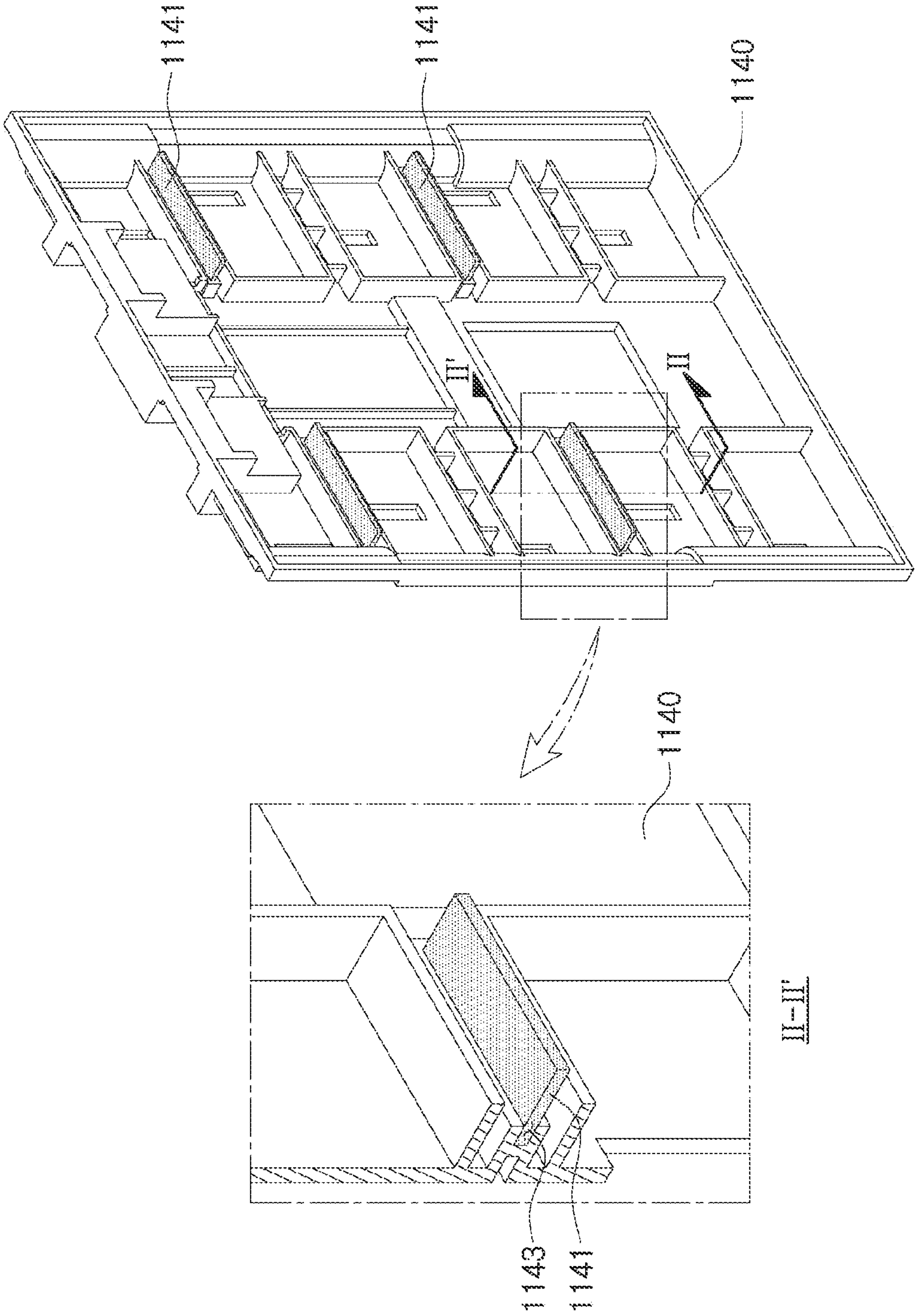
FIG. 5 is a perspective diagram illustrating an insulation cover included in a battery module.
Figure 6:
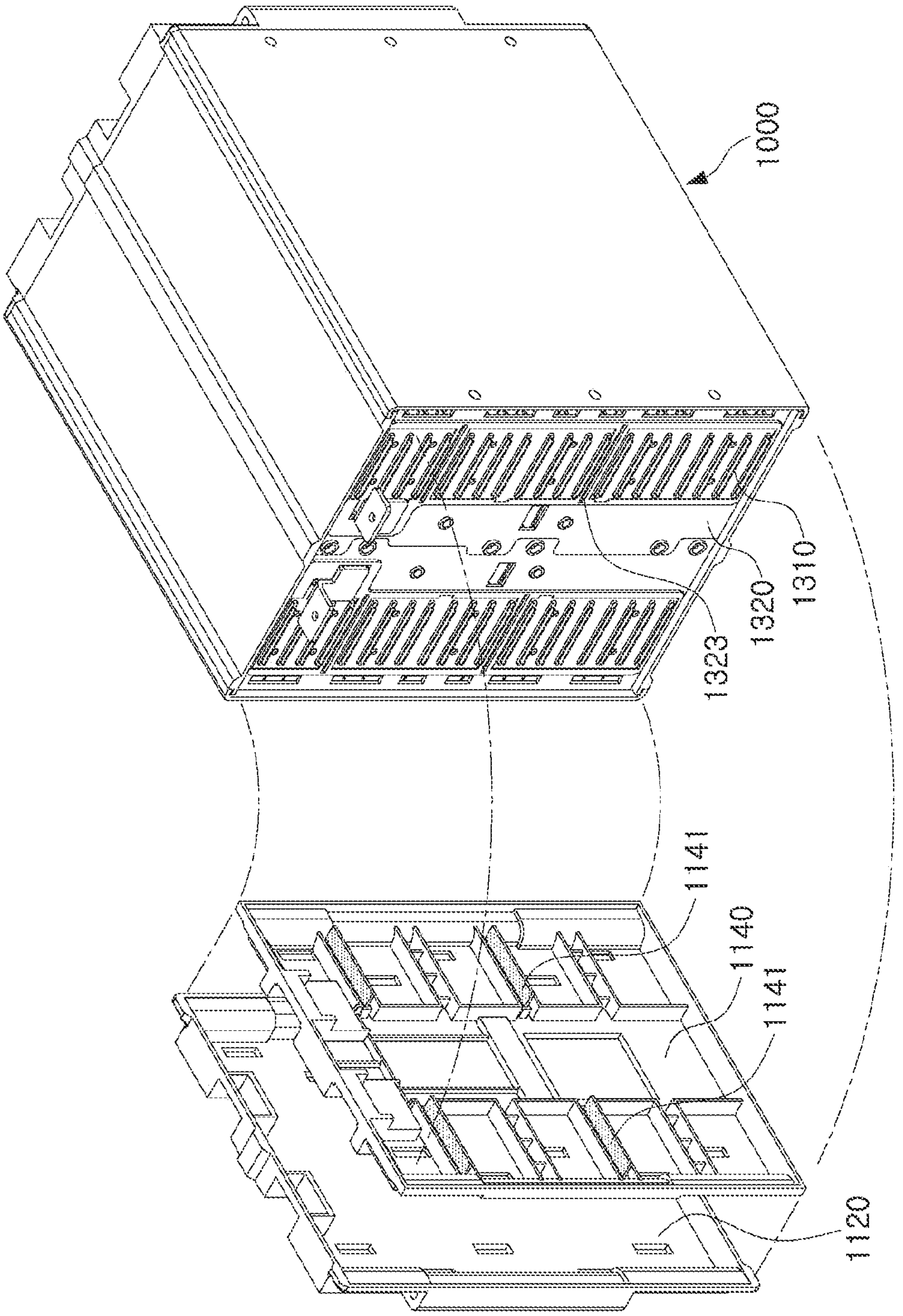
FIG. 6 is a diagram illustrating combination of an insulation cover and a cell block.
Figure 7:
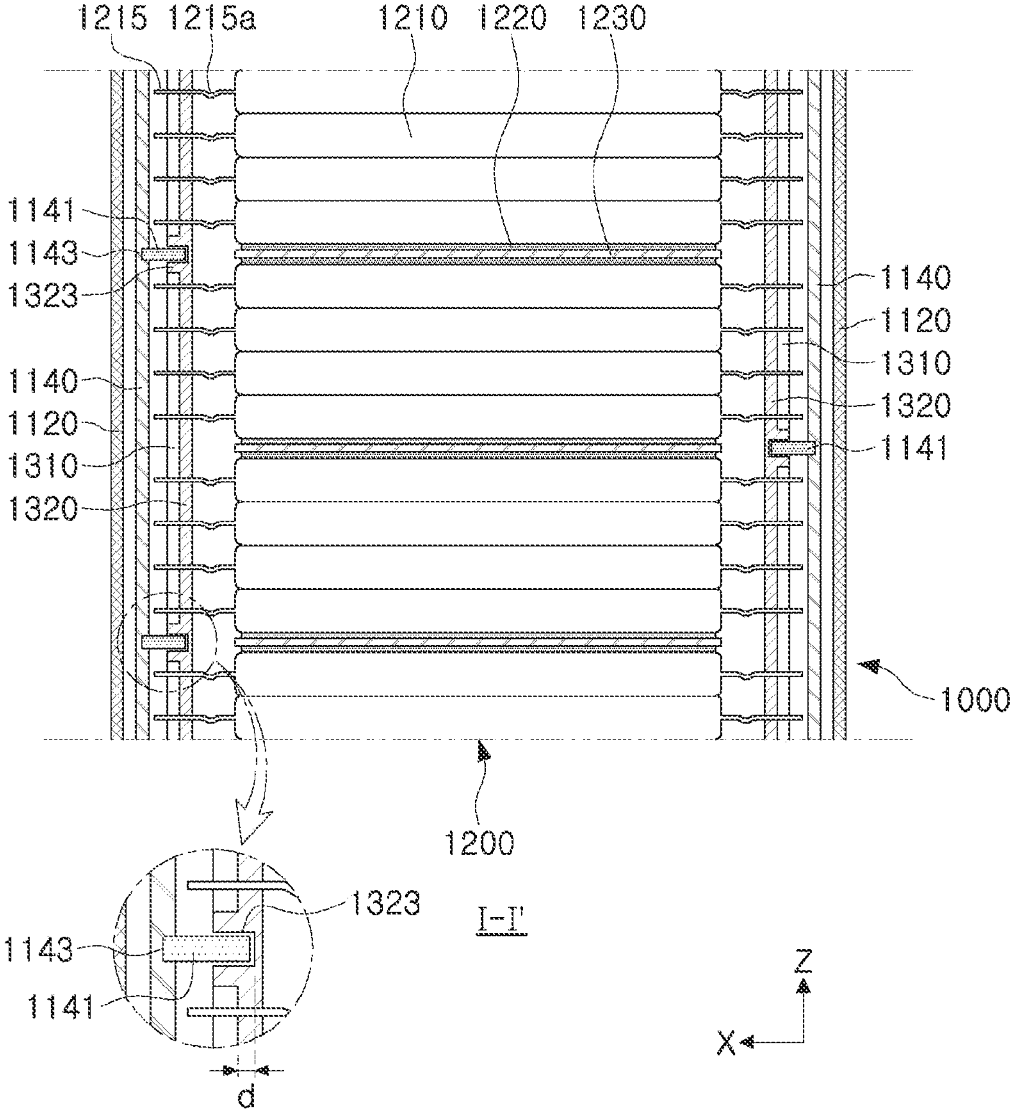
FIG. 7 is a cross-sectional diagram taken long line I-I' in FIG. 1.
Figure 8:
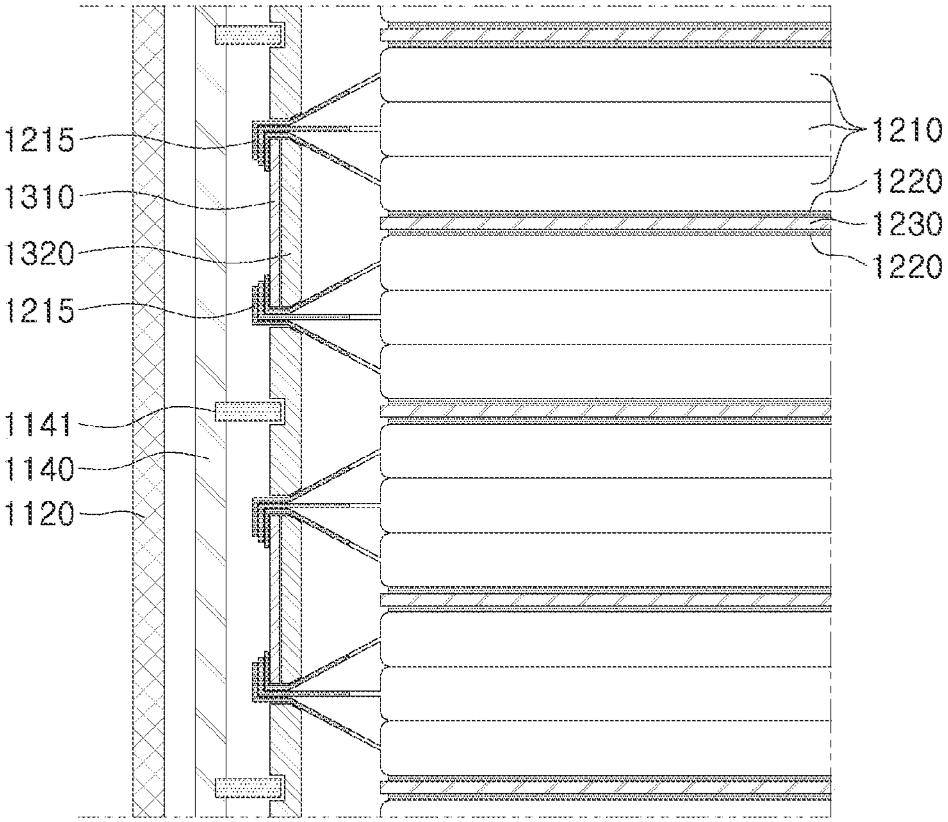
FIG. 8 is a cross-sectional diagram taken long line I-I' in FIG. 1.

FIG. 5 is a perspective diagram illustrating an insulation cover 1140 included in a battery module. FIG. 6 is a diagram illustrating combination of an insulation cover 1140 and a cell block. FIGS. 7 and 8 are cross-sectional diagrams taken long line I-I' in FIG. 1, illustrating arrangement of the short-circuit prevention member 1141. The short-circuit prevention member 1141, the insulation cover 1140, the cell block and the battery module 1000 including the same described in FIGS. 5 to 8 may be similar to the short-circuit prevention member 1141, the insulation cover 1140, the cell block, and the battery module 1000 including the same. For example, the cell stack 1200 may include a plurality of battery cells 1210, an insulating sheet 1230, and a compression pad 1220, which may correspond to the cell stack 1200 described above with reference to FIGS. 1 to 5. Therefore, the overlapping description will not be provided.

The short-circuit prevention member 1141 may be coupled to the insulation cover 1140. For example, as illustrated in the enlarged diagram in FIG. 5, the short-circuit prevention member 1141 may be provided as a rectangular plate-shaped member, such that at least a portion thereof may be inserted into the insertion groove 1143 of the insulation cover 1140.

The short-circuit prevention member 1141 may be fixed to the insulation cover 1140 in various manners. For example, the short-circuit prevention member 1141 may be fixed by being pressed into the insertion groove 1143 of the insulation cover 1140. A coupling protrusion (not illustrated) may be optionally provided in the insertion groove 1143 or the short-circuit prevention member 1141 of the insulation cover 1140. For example, a plurality of coupling protrusions (not illustrated) protruding in opposite directions may be provided in the insertion groove 1143 of the insulation cover 1140. The coupling protrusions (not illustrated) may firmly fix the short-circuit prevention member 1141 by pressing the short-circuit prevention member 1141 from both sides. Accordingly, fastening strength of the short-circuit prevention member 1141 may be increased. Alternatively, the short-circuit prevention member 1141 may be fixed to the insulation cover 1140 through an insert injection process.

One side surface of the insulation cover 1140 may be disposed to oppose the busbar frame 1320, and the short-circuit prevention member 1141 may be fixed to the one surface. The short-circuit prevention member 1141 may be provided as a rectangular plate-shaped member, and in this case, a wide surface may be disposed to be perpendicular to the stacking direction of the battery cells 1210. At least a portion of the short-circuit prevention member 1141 may be inserted into the cell block. For example, as illustrated in FIG. 6, one end of the short-circuit prevention member 1141 may be coupled to the insulation cover 1140, and the other end opposite to one end may be inserted into the busbar frame 1320.

The busbar frame 1320 may be provided with an accommodation groove 1323 in which at least a portion of the short-circuit prevention member 1141 is accommodated. That is, one end of the short-circuit prevention member 1141 may be inserted into and fixed to the insulation cover 1140, and the other end may be disposed in the accommodation groove 1323 of the busbar frame 1320. For example, as illustrated in FIG. 7, one or more accommodating grooves 1323 open in a direction toward the insulation cover 1140 may be provided in the busbar frame 1320, and at least a portion of the short-circuit prevention member 1141 coupled to the insulation cover 1140 may be disposed in the accommodation groove 1323.

Differently from FIG. 7, the short-circuit prevention member 1141 may be disposed to penetrate through the busbar frame 1320. That is, one end of the short-circuit prevention member 1141 may be fixed to the insulation cover 1140, and the other end may penetrate through the busbar frame 1320 to oppose the cell stack. In this case, the accommodation groove 1323 of the busbar frame 1320 may be provided in the shape of a hole penetrating from one surface to the other surface of the busbar frame 1320.

At least a portion of the short-circuit prevention member 1141 may be disposed between two busbars 1310 adjacent to each other and may electrically and physically isolate the two busbars 1310 from each other. For example, as illustrated in FIG. 7, the plurality of busbars 1310 may be disposed side by side on one surface of the busbar frame 1320 in the stacking direction of the battery cells 1210, and at least a portion of the short-circuit prevention member 1141 extending from the cell stack 1200 toward the cell stack 1200 may be disposed between the busbars 1310. In this case, a conceptual line connecting the busbars 1310 to each other may penetrate through the short-circuit prevention member 1141.

One end of the short-circuit prevention member 1141 may be fixed to the insulation cover 1140, and the other end may be inserted into the accommodation groove 1323 of the busbar frame 1320. In this case, the other end of the short-circuit prevention member 1141 may be provided to protrude further toward the cell stack 1200 than the busbar 1310. For example, referring to FIG. 7, when the distance from the surface of the busbar 1310 opposing the busbar frame 1320 to the end of the short-circuit prevention member 1141 is defined as d, d may have a value of 0 or more.

The accommodation groove 1323 of the busbar frame 1320 may be disposed between the seating portions (e.g., 1321 in FIG. 4) on which the busbar 1310 is seated. That is, the short-circuit prevention member 1141 may be provided to be inserted into the busbar frame 1320 by avoiding the busbar 1310 disposed on the seating portion 1321 (in FIG. 4). However, the position of the accommodation groove 1323 is not limited thereto. For example, the accommodation groove 1323 may be formed in the seating portion (1321 in FIG. 4) on which the busbar 1310 is seated. In this case, the short-circuit prevention member 1141 may be disposed to be inserted into both the busbar 1310 and the busbar frame 1320, which will be described later with reference to FIGS. 9 to 11.

Referring to FIGS. 5 to 7, the short-circuit prevention members 1141 respectively disposed on the insulation covers 1140 on both sides of the cell stack 1200 may be alternately disposed in the stacking direction of the battery cells 1210. For example, as illustrated in the cross-sectional diagram in FIG. 7, the short-circuit preventing member 1141 disposed on one insulation cover 1140 and the short-circuit preventing member 1141 disposed on the other insulation cover 1140 may be alternately disposed in the stacking direction of the battery cells 1210.

The short-circuit prevention member 1141 may include a material having electrical insulation and sufficient heat resistance at an elevated temperature (e.g., 300 degrees Celsius or more in some implementations). As the short-circuit prevention member 1141 having insulation and heat resistance is inserted into a region between the busbars 1310, even when the busbar frame 1320 collapses in a high temperature environment, the busbars 1310 may be spaced apart from each other by the short-circuit preventing members 1141 and may maintain an electrically insulated state. That is, the short-circuit prevention member 1141 may maintain a space between the adjacent busbars 1310 and may prevent the busbars 1310 from being in contact with each other each other and being electrically short-circuited.

The plurality of busbars 1310 and the plurality of short-circuit prevention members 1141 may be alternately disposed in one direction (e.g., the Z-axis direction in FIG. 7). In this case, the arrangement direction of the plurality of busbars 1310 and the plurality of short-circuit prevention members 1141 may be the same as the direction of gravity. Accordingly, while the busbar frame 1320 is thermally deformed due to a fire in the battery module 1000, the short-circuit prevention member 1141 may prevent the busbars 1310 from being moved in the gravity direction and from being in contact with each other.

The lead tab 1215 of the battery cell 1210 may be electrically connected to the busbar 1310. Referring to FIG. 7, the lead tab 1215 may include a bending portion **1215*a* formed by bending at least a portion of the lead tab 1215. For example, the bending portion 1215*a* may be a portion bent in a "U" shape among the lead tabs 1215. The bending portion 1215*a* may absorb impact or vibration applied to the lead tab 1215. As the bending portion 1215*a* is provided, damage to the lead tab 1215 due to external impact or vibration may be prevented, and the coupling between the lead tab 1215** and the busbar may be stably maintained.

The lead tab 1215 of the battery cell 1210 may be connected to the busbar 1310 in various manners. For example, as illustrated in FIG. 7, the lead tabs 1215 of the plurality of battery cells 1210 may be connected to the busbars 1310, respectively. Alternatively, as illustrated in FIG. 8, the plurality of lead tabs 1215 adjacent to each other may be in contact with each other and may be connected to the busbar 1310 together.

The lead tab 1215 may be electrically connected to the busbar 1310 by welding. To increase the contact area between the lead tab 1215 and the busbar 1310, at least a portion of the lead tab 1215 may be bent to oppose the surface of the busbar 1310. For example, as illustrated in FIG. 8, at least a portion of the lead tabs 1215 of the battery cells 1210 adjacent to each other may be bent to have a surface opposite to the surface of the busbar 1310, and the plurality of lead tabs 1215 bent together may overlap and may be connected to the same busbar 1310. That is, the lead tabs 1215 of the same polarity may be bent and may be aligned with the same busbar 1310, and may be connected to each other by welding. In this case, since there may be a risk in which welding quality may not be uniform due to overlapping of the lead tabs 1215, a plurality of welding points may be determined if desired. For example, when three lead tabs 1215 overlap and are connected to a single busbar 1310 as illustrated in FIG. 8, a first welding point may be configured to be a portion in which three lead tabs 1215 overlap, and a second welding point may be configured to be a portion in which two of the lead tabs 1215 overlap. As such, the plurality of lead tabs 1215 may be effectively connected to the busbar 1310.

At least a portion of the plurality of short-circuit prevention members 1141 may be disposed to penetrate through the busbar 1310. Hereinafter, the battery module 1000 including the short-circuit prevention member 1142 penetrating the busbar 1310 will be described with reference to FIGS. 9 to 11.

Figure 9:
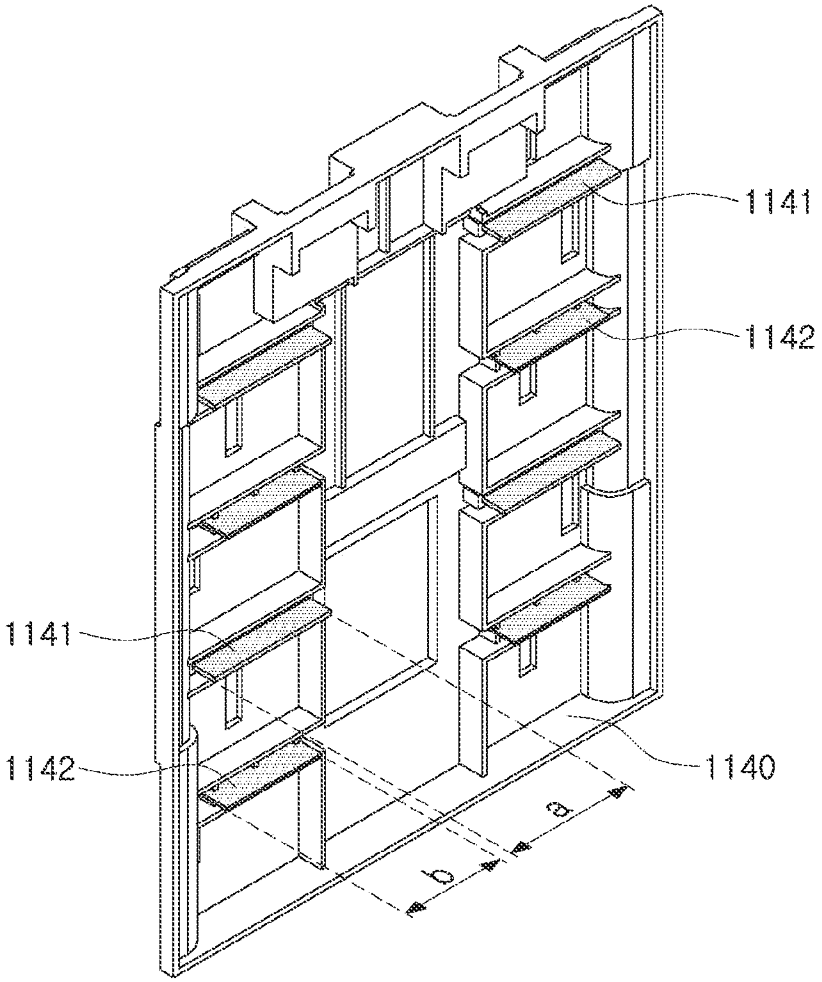
FIG. 9 is a perspective diagram illustrating an insulation cover included in a battery module.
Figure 10:
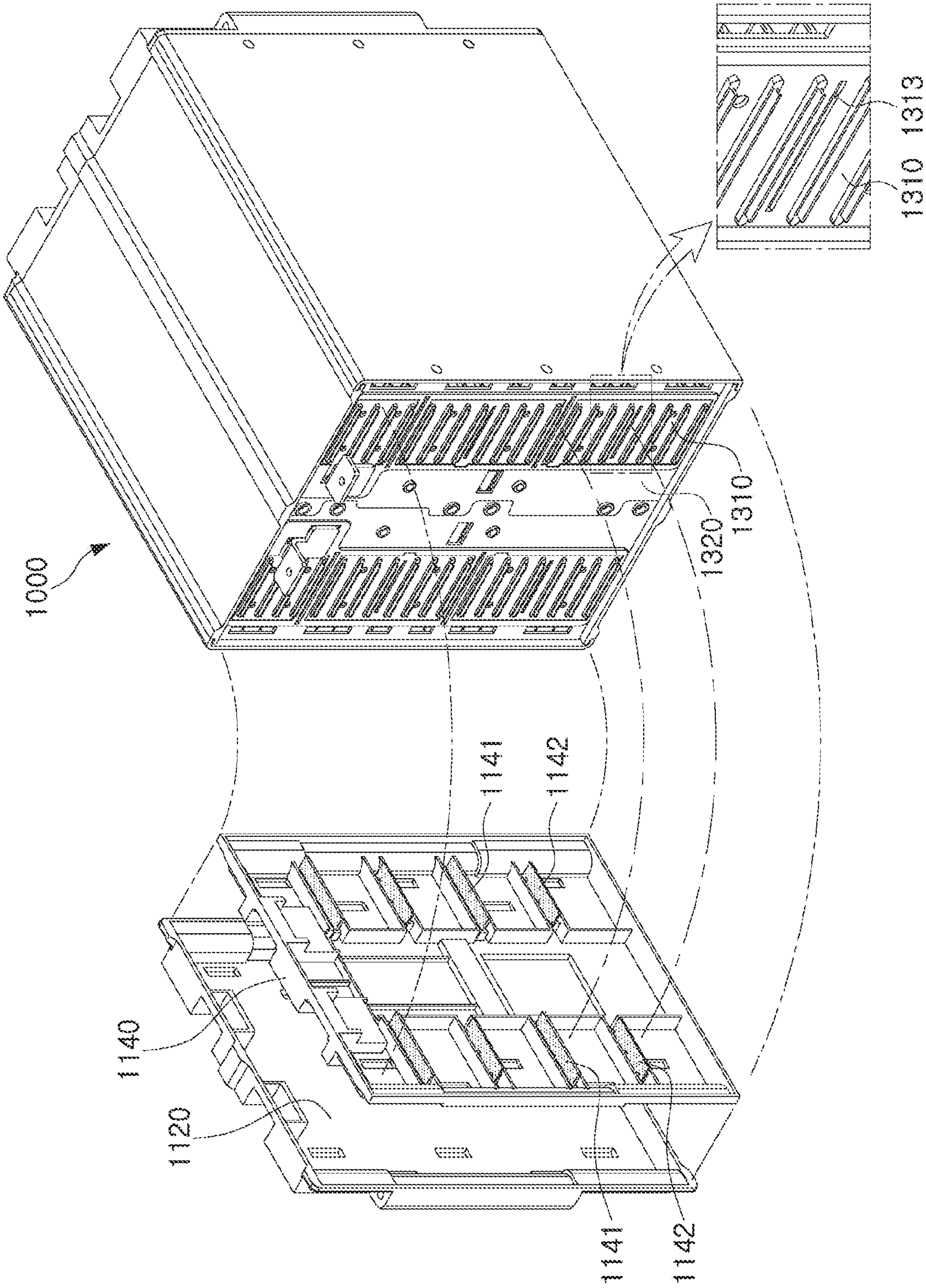
FIG. 10 is a diagram illustrating combination of an insulation cover and a cell block.
Figure 11:
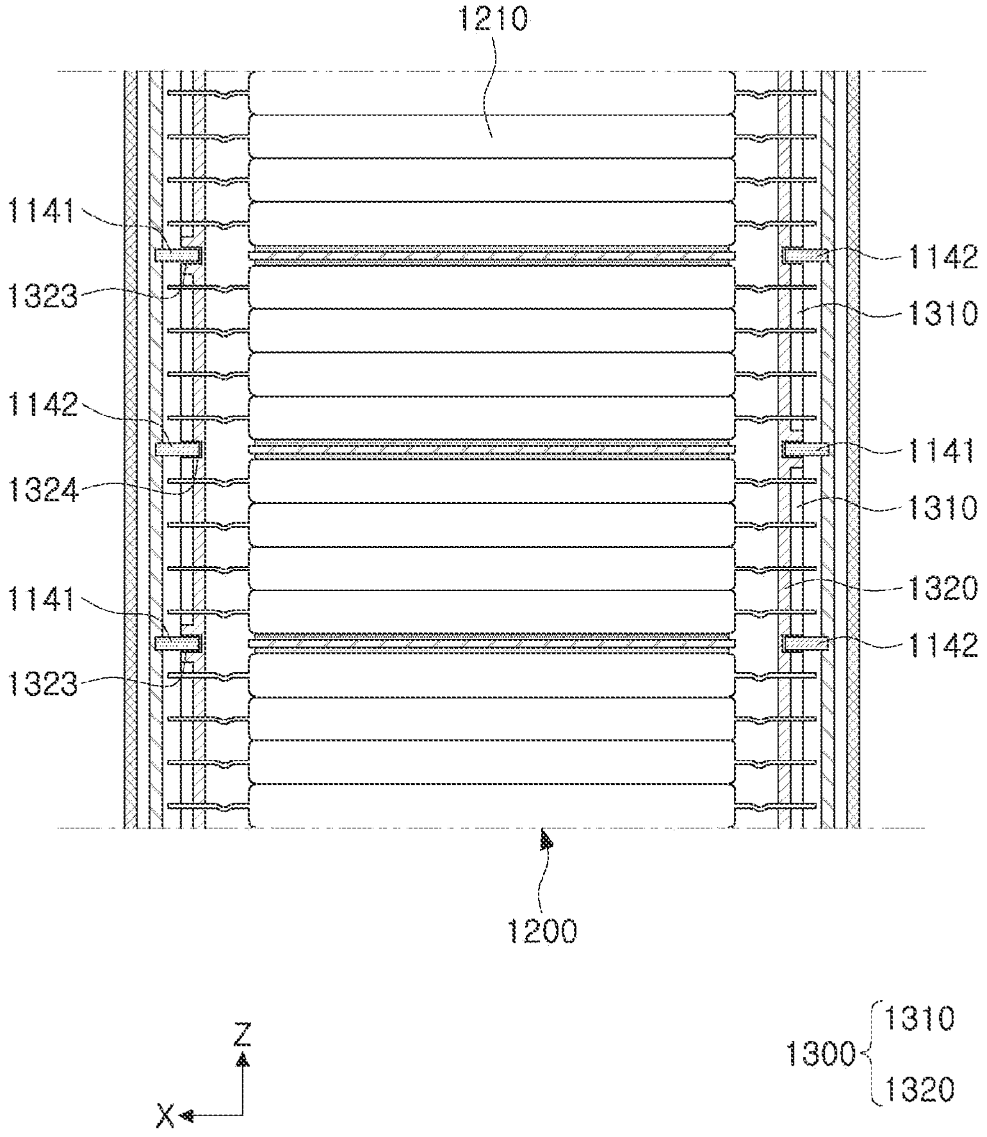
FIG. 11 is a cross-sectional diagram taken long line I-I' in FIG. 1.

FIG. 9 is a perspective diagram illustrating an insulation cover 1140 included in a battery module. FIG. 10 is a diagram illustrating combination of an insulation cover 1140 and a cell block. FIG. 11 is a cross-sectional diagram taken long line I-I' in FIG. 1, illustrating arrangement of the short-circuit prevention members 1141 and 1142. The short-circuit prevention member, the insulation cover, the cell block, and the battery module including the same described in FIGS. 9 to 11 may be similar to the short-circuit prevention member 1141, the insulation cover 1140, the cell block and the battery module 1000 including the same described in FIGS. 1 to 8 above, and may further include a different type of the short-circuit prevention member (e.g., the second short-circuit prevention member 1142 in the description below), and thus, descriptions overlapping the descriptions of the aforementioned example embodiments described with reference to FIGS. 1 to 8 will not be provided.

The battery module 1000 may include different types of short-circuit prevention members 1141 and 1142. For example, the battery module 1000 may include one or more first short-circuit preventing members 1141 disposed between two busbars 1310 adjacent to each other among the plurality of busbars 1310, and one or more second short-circuit prevention members 1142 of which a portion penetrates the plurality of busbars 1310. Here, the first short-circuit preventing member 1141 may correspond to the short-circuit preventing member 1141 described above with reference to FIGS. 5 to 8. Therefore, the description of the short-circuit preventing member 1141 in FIGS. 5 to 8*a* may be applied to the first short-circuit preventing member 1141.

The first short-circuit prevention member 1141 and the second short-circuit prevention member 1142 may be coupled to different positions of the insulation cover 1140. For example, as illustrated in FIG. 9, the first and second short-circuit prevention members 1141 and 1142 may be disposed side by side with a distance therebetween on one surface of the insulation cover 1140 opposing the busbar assembly 1300. The spacing direction of the first and second short-circuit prevention members 1141 and 1142 may be the same as the stacking direction of the battery cells 1210. The method of coupling the second short-circuit prevention member 1142 to the insulation cover 1140 may be the same as one of the coupling methods of the first short-circuit prevention member 1141 and the insulation cover 1140, and descriptions described with reference to FIGS. 5 to 8 may be applied thereto.

The first and second short-circuit prevention members 1141 and 1142 may have different sizes. For example, the first and second short-circuit prevention members 1141 and 1142 may be provided in a rectangular plate shape, and the widths of the square plates may be configured to be different from each other. As illustrated in FIG. 9, when the width of the first short-circuit preventing member is defined as a and the width of the second short-circuit preventing member is defined as b, a may have a greater value than b.

More specifically, when the stacking direction of the battery cells 1210 is defined as the first direction, and the direction perpendicular to the first direction and horizontal to the surface of the busbar 1310 is defined as the second direction, a length of the first short-circuit prevention member 1141 in the second direction may be greater than a length of the second short-circuit prevention member 1142 in the second direction. The length of the first short-circuit prevention member 1141 in the second direction may be greater than the length of the busbar 1310 in the second direction, and the length of the second short-circuit prevention member 1142 in the second direction may be smaller than the busbar 1310 in the second direction. However, the sizes of the first and second short-circuit prevention members 1141 and 1142 are not limited to the above-described example. For example, the first and second short-circuit prevention members 1141 and 1142 may have the same size.

The first and second short-circuit prevention members 1141 and 1142 may be inserted into different portions of the busbar assembly 1300. For example, as illustrated in FIG. 10 or FIG. 11, at least a portion of the first short-circuit prevention member 1141 may be disposed between two busbars 1310 adjacent to each other, and at least a portion of the second short-circuit prevention member 1142 may be arranged to penetrate through the busbar 1310. In this case, a through groove 1313 may be disposed in the busbar 1310 such that the second short-circuit prevention member 1142 may penetrate therethrough.

A first accommodating groove 1323 and a second accommodating groove 1324 in which at least a portion of the first and second short-circuit prevention members 1141 and 1142 are accommodated, respectively, may be disposed in the busbar frame 1320. That is, one end of the first and second short-circuit preventing members 1141 and 1142 may be inserted into and fixed to the insulation cover 1140, and the other end may be disposed in the first and second accommodating grooves 1323 and 1324 of the busbar frame 1320. In this case, the second accommodating groove 1324 of the busbar frame 1320 may be disposed parallel to the through groove of the busbar in the seating portion (e.g., 1321 in FIG. 4) of the busbar frame 1320.

The first and second short-circuit prevention members 1141 and 1142 disposed on the insulation covers 1140 on both sides of the cell stack 1200, respectively, may be alternately disposed in the stacking direction of the battery cells 1210. For example, as illustrated in the cross-sectional diagram in FIG. 11, the second short-circuit preventing member 1142 disposed on one insulation cover 1140 and the second short-circuit preventing member 1142 disposed on the other insulation cover 1140 may be alternately disposed in the stacking direction of the battery cell 1210. In this case, the first short-circuit prevention member 1141 disposed on one insulation cover 1140 and the second short-circuit prevention member 1142 disposed on the other insulation cover 1140 may be disposed to oppose each other in a direction perpendicular to the stacking direction of the battery cells 1210.

The second short-circuit prevention member 1142 may include the same material as that of the first short-circuit prevention member 1141. For example, at least one of the first and second short-circuit prevention members 1141 and 1142 may include a material (mica, ceramic wool, and Aerogel) having insulation and heat resistance of 300 degrees Celsius or more. As the short-circuit prevention members 1141 and 1142 having insulation and heat resistance are inserted into a region between the busbars, the busbars 1310 may be spaced apart from each other by the short-circuit prevention members 1141 and 1142 and may maintain an electrically insulated state even when the busbar frame 1320 collapse. In particular, as the second short-circuit prevention member 1142 is disposed to penetrate through the busbar 1310, the busbar 1310 may be supported more stably as compared to the example in which only the first short-circuit prevention member 1141 is disposed.

The plurality of first and second short-circuit prevention members 1141 and 1142 may be alternately disposed in one direction. In this case, the arrangement direction of the plurality of busbars 1310 and the plurality of short-circuit prevention members 1141 and 1142 may be the same as the direction of gravity. Accordingly, while the busbar frame 1320 is thermally deformed due to a fire in the battery module 1000, the short-circuit prevention members 1141 and 1142 may prevent the busbar 1310 from moving in the direction of gravity and being in contact with each other.

Another short-circuit prevention member 1141 may be coupled to the busbar assembly 1300. Hereinafter, the battery module 1000 including the short-circuit prevention member 1141 coupled to the busbar assembly 1300 will be described with reference to FIGS. 12 to 14.

Figure 12:
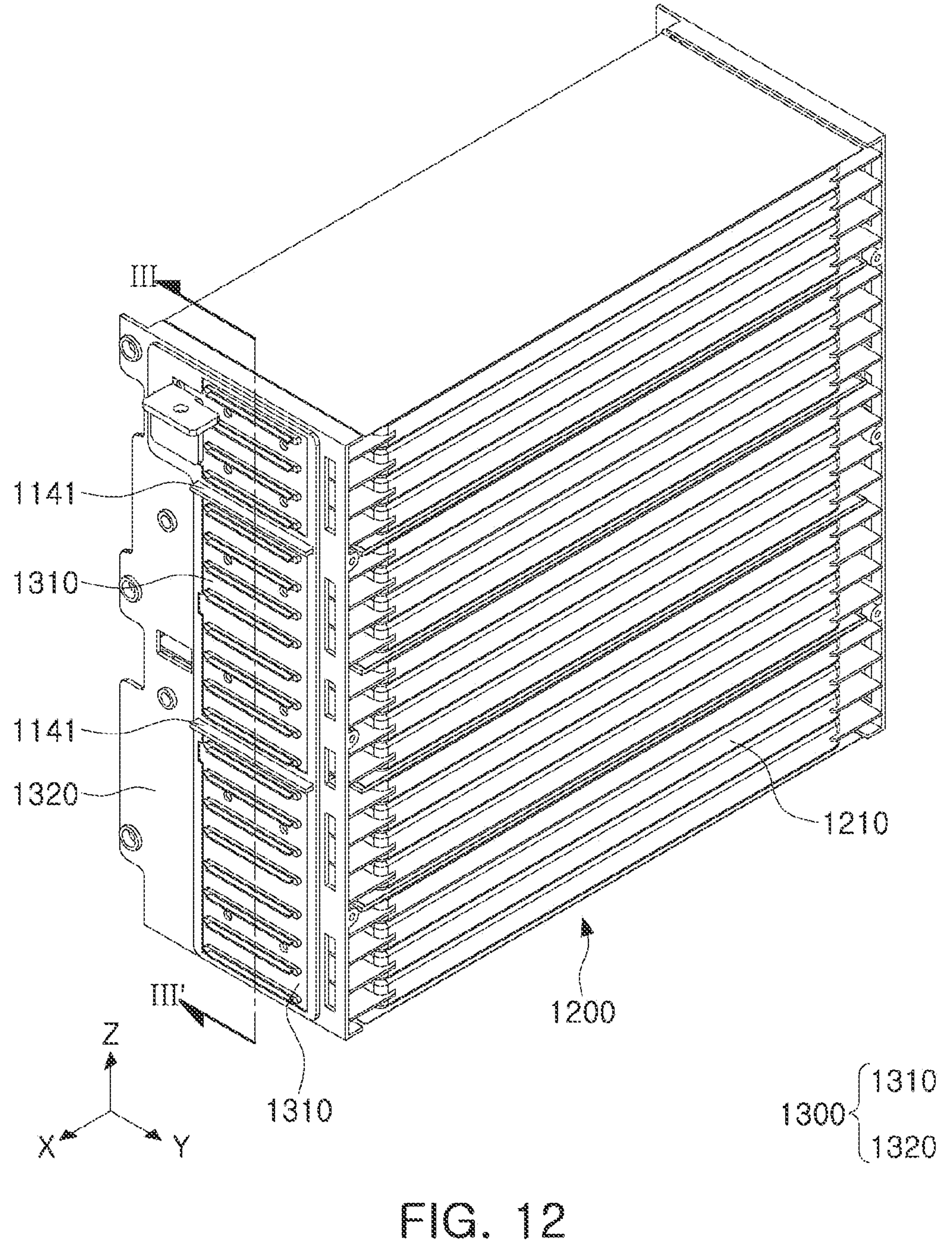
FIG. 12 is a perspective diagram illustrating a cell block included in a battery module.
Figure 13:
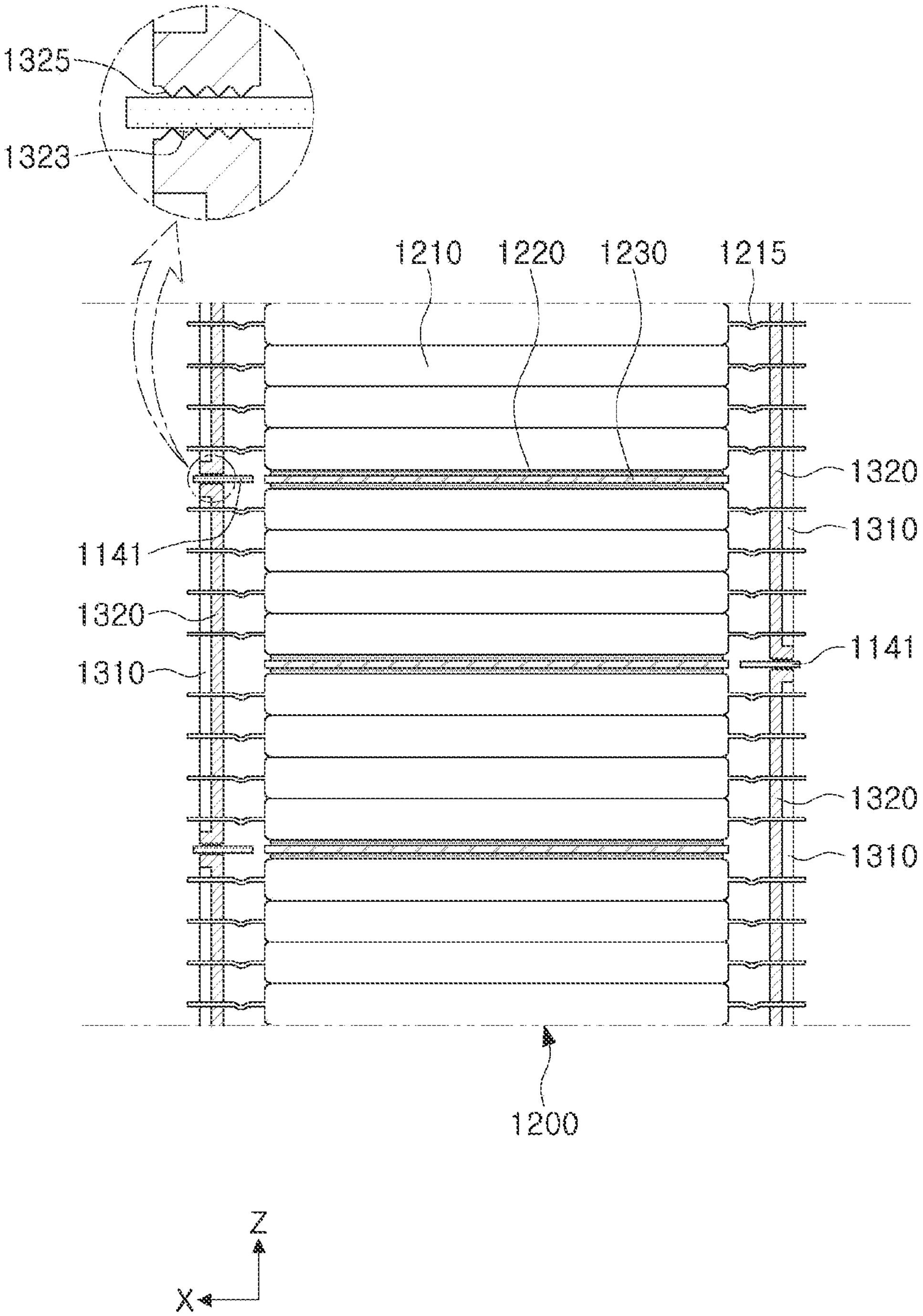
FIG. 13 is a cross-sectional diagram taken long line III-III' in FIG. 12.
Figure 14:
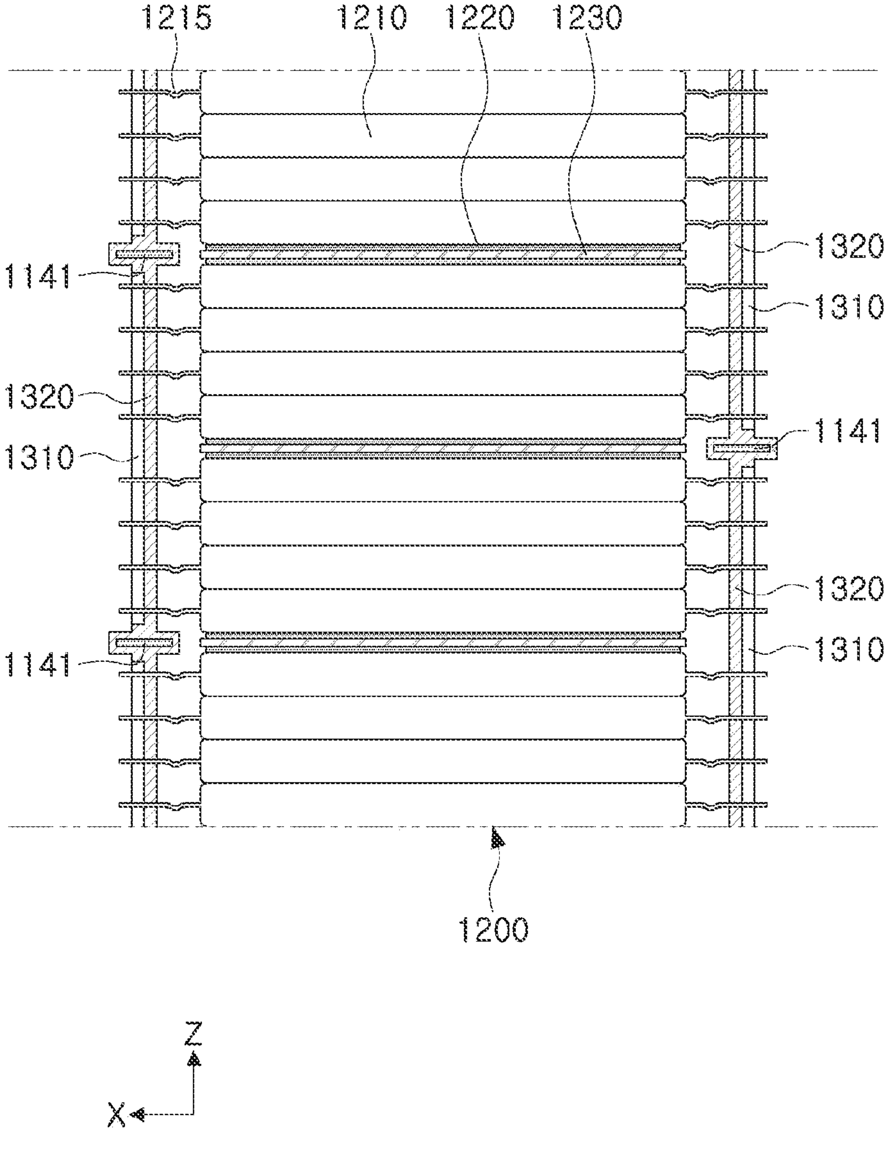
FIG. 14 is a cross-sectional diagram taken long line III-III' in FIG. 12.

FIG. 12 is a perspective diagram illustrating a cell block included in a battery module. FIGS. 13 and 14 are cross-sectional diagrams taken long line III-III' in FIG. 1, illustrating a cell block included in the battery module 1000. The short-circuit prevention member 1141, the cell block, and the battery module 1000 including the same described in FIGS. 12 to 14 may be similar to the short-circuit prevention member 1141, the cell block, and the battery module 1000 including the same described in FIGS. 1 to 4 above, and thus, overlapping descriptions will not be provided.

The short-circuit prevention member 1141 may be coupled to the busbar assembly 1300. For example, as illustrated in the cross-sectional diagram in FIG. 13 or 14, the short-circuit prevention member 1141 may be coupled to the busbar frame 1320.

The short-circuit prevention member 1141 may be fixed to the busbar assembly 1300 in various manners. For example, as illustrated in FIG. 13, the short-circuit prevention member 1141 may be fixed by being pressed into the insertion groove 1323 disposed in the busbar frame 1320. A coupling protrusion 1325 may be optionally provided in the insertion groove 1323 or the short-circuit prevention member 1141 of the busbar frame 1320. For example, a plurality of coupling protrusions 1325 protruding in opposite directions may be provided in the insertion groove 1323 of the busbar frame 1320. The coupling protrusion 1325 may firmly fix the short-circuit prevention member 1141 by pressing the short-circuit prevention member 1141 from both sides. Accordingly, fastening strength of the short-circuit prevention member 1141 may be increased. Alternatively, as illustrated in FIG. 14, the short-circuit prevention member 1141 may be fixed to the busbar frame 1320 through an insert injection process. In this case, the short-circuit prevention member 1141 may be disposed such that entirety of surfaces thereof may be surrounded by the busbar frame 1320, or at least a portion thereof may be surrounded by the busbar frame 1320.

At least a portion of the short-circuit prevention member 1141 may be disposed between two busbars 1310 adjacent to each other and may electrically and physically isolate the two busbars 1310 from each other. For example, as illustrated in FIG. 13, a plurality of busbars 1310 may be disposed side by side on one surface of the busbar frame 1320 in the stacking direction of the battery cells 1210, and at least a portion of the short-circuit prevention member 1141 inserted into the busbar frame 1320 may be disposed between the busbars 1310 adjacent to each other. In this case, a virtual line (or an imaginary line) connecting the adjacent busbars 1310 to each other may penetrate through the short-circuit prevention member 1141.

An end of the short-circuit prevention member 1141 may protrude further toward the insulation cover (e.g., 1140 in FIG. 2) than the surface of one side surface of the busbars 1310 adjacent to the short-circuit prevention member 1141. Alternatively, an end of the short-circuit prevention member 1141 may protrude further toward the cell stack 1200 than the other surface of the busbars 1310 adjacent to the short-circuit prevention member 1141. Accordingly, physical contact between the two busbars 1310 with the short-circuit preventing member 1141 interposed therebetween may be reliably prevented by the short-circuit preventing member 1141.

The plurality of busbars 1310 and the plurality of short-circuit prevention members 1141 may be alternately disposed in one direction (e.g., the Z-axis direction in FIG. 13) on the busbar frame 1320. In this case, the arrangement direction of the plurality of busbars 1310 and the plurality of short-circuit prevention members 1141 may be the same as the direction of gravity. Accordingly, while the busbar frame 1320 is thermally deformed due to a fire in the battery module 1000, the short-circuit prevention member 1141 may prevent the busbars 1310 from moving in the direction of gravity and from being in contact with each other.

The short-circuit prevention member 1141 may be alternately disposed in the stacking direction of the battery cells 1210 on both sides of the cell stack 1200. For example, as illustrated in the cross-sectional diagram in FIG. 13, the short-circuit preventing member 1141 disposed on one busbar frame 1320 and the short-circuit preventing member 1141 disposed on the other busbar frame 1320 may be alternately disposed in the stacking direction of the battery cells 1210. That is, the short-circuit prevention member 1141 coupled to one busbar frame 1320 may be disposed between two short-circuit prevention members 1141 coupled to the bar frame 1320 with respect to the first direction (e.g., the Z-axis direction in FIG. 13), which is the stacking direction of the battery cells 1210.

The lead tab 1215 of the battery cell 1210 may be connected to the busbar 1310 in various manners, to which the description of the lead tab 1215 of the battery cell 1210 described above with reference to FIGS. 5 to 8 may be applied.

In FIGS. 12 to 14, the short-circuit prevention member 1141 disposed between the busbars 1310 is illustrated, but the arrangement position of the short-circuit prevention member 1141 is not limited thereto. For example, a portion of the plurality of short-circuit prevention members 1141 may be disposed between the busbars 1310, and the others may be disposed to penetrate through the busbars 1310. In this case, the short-circuit prevention member 1141 penetrating through the busbars 1310 may have a size smaller than that of the short-circuit prevention member 1141 disposed between the busbars.

The short-circuit prevention member 1141 may include a material having insulation and heat resistance of 300 degrees Celsius or more. As the short-circuit prevention member 1141 having insulation and heat resistance is inserted into a region between the busbars 1310, the busbars 1310 may be spaced apart from each other by the short-circuit prevention member 1141 and may maintain an electrically insulated state even while the busbar frame 1320 collapses. In particular, since the short-circuit prevention member 1141 for withstanding high temperature is inserted into the busbar frame 1320, electrical and structural stability of the busbar frame 1320 may significantly improve during thermal runaway.

A plurality of battery modules may be connected to each other and may form a battery pack. Hereinafter, a battery pack 100 including a plurality of battery modules 1000 will be described with reference to FIG. 15.

Figure 15:
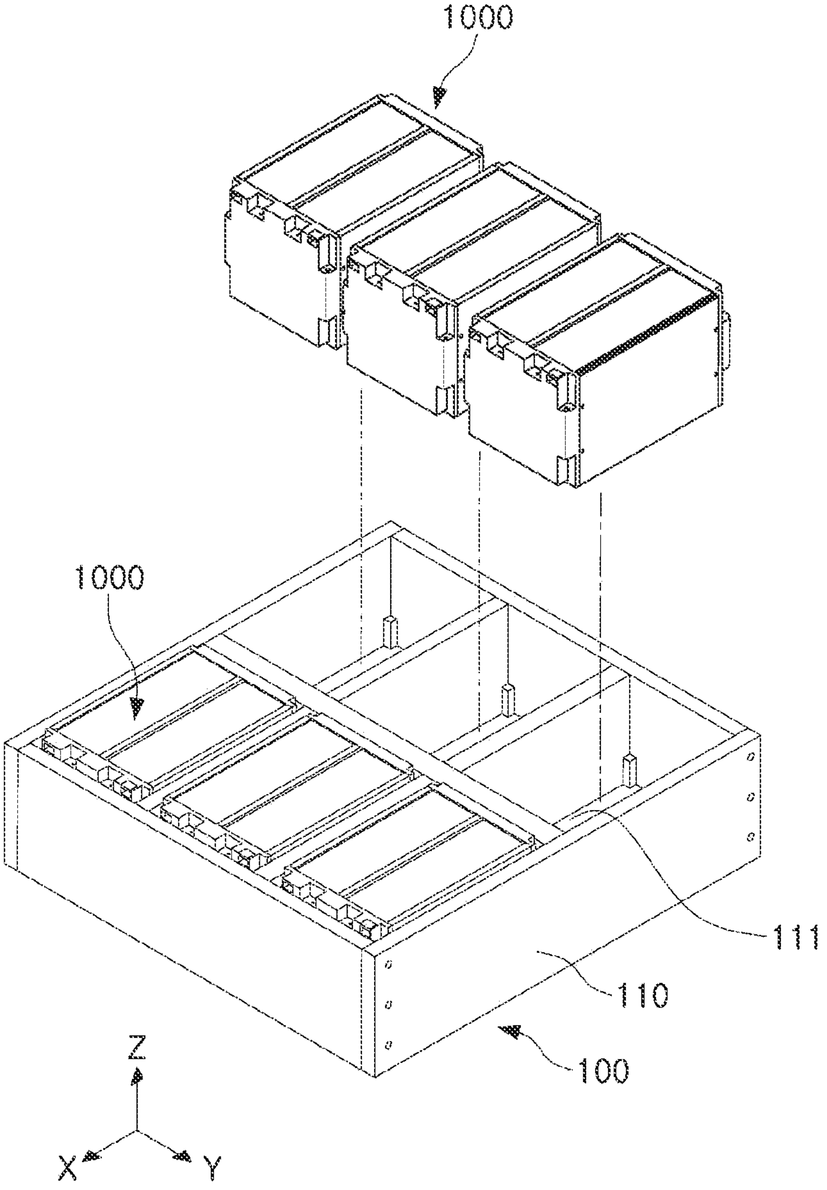
FIG. 15 is an exploded perspective diagram illustrating a portion of a battery pack.

FIG. 15 is an exploded perspective diagram illustrating a portion of a battery pack 100. Since the battery module 1000 described in FIG. 15 may be similar to the battery module 1000 described in FIGS. 1 to 14, overlapping descriptions will not be provided.

The battery pack 100 may include a pack housing 110 having an internal space and one or more battery modules 1000 accommodated in the pack housing 110. For example, as illustrated in FIG. 15, at least one battery module 1000 may be seated on the lower frame 111 of the pack housing 110. Although not illustrated in FIG. 15, the battery pack 100 may further include a cover (not illustrated) covering the upper portion of the battery module 1000 and closing the internal space of the battery pack 100.

When a plurality of battery modules 1000 are disposed, at least a portion of the battery modules 1000 may be disposed in a direction parallel to the lower frame 111 (e.g., X-axis or Y-axis direction). Alternatively, at least a portion of the battery modules 1000 may be stacked in a direction (e.g., Z-axis direction) perpendicular to the lower frame 111.

According to the aforementioned example embodiments, a battery module and a battery pack in which at least a portion of the short-circuit preventing member may be inserted into the busbar assembly, such that a distance between the busbars may be stably maintained during thermal runaway in the battery module may be implemented.

Also, the battery module and the battery pack may include a short-circuit prevention member formed of a material having a melting point higher than that of the busbar frame, such that, even when a high-temperature, high-pressure gas or flame is generated in the battery module or battery pack, structural collapse of the busbar assembly may be prevented.

Also, in the battery module and the battery pack, at least a portion of the short-circuit prevention member may be disposed between the busbars adjacent to each other or may penetrate the busbars such that the busbars may be physically prevented from being in contact with each other each other.

Also, even when the busbar frame collapses during thermal runaway of the battery module and the battery pack, the distance between the busbars may be properly maintained by the short-circuit prevention member. Accordingly, an electrical short circuit between the busbars may be prevented, and electrical and structural collapse of the battery module and the battery pack and the chain ignition of the battery cells may be prevented.

While the example embodiments have been illustrated and described above, it will be apparent to those skilled in the art that modifications and variations could be made based on the present disclosure.

What is claimed is:

1. A battery module, comprising:

a cell stack including a plurality of battery cells arranged in a direction of gravity;

a housing including an internal space to accommodate the cell stack;

a plurality of electrically conductive connectors electrically connected to the plurality of battery cells;

a support frame arranged to face at least one side surface of the cell stack and supporting the plurality of electrically conductive connectors;

an insulation cover disposed between the support frame and the housing; and one or more short-circuit prevention members disposed on at least part of the insulation cover to electrically isolate the plurality of electrically conductive connectors from each other, wherein the one or more short-circuit prevention members are arranged such that a first surface of the one or more short-circuit prevention members facing the plurality of electrically conductive connectors extends in a direction crossing the direction of gravity.

2. The battery module of claim 1, wherein the short-circuit prevention member includes a material that has a property that prevents or retards a passage of excessive heat or flames, wherein the property includes at least one of heat resistance, flame retardancy, or heat insulation.

3. The battery module of claim 2, wherein the one or more short-circuit prevention members include a material having a melting point higher than a melting point of a material that constitutes at least part of the support frame.

4. The battery module of claim 3, wherein the one or more short-circuit prevention members include mica, ceramic wool, aerogel, or a combination of two or more of mica, ceramic wool, and aerogel.

5. The battery module of claim 1, wherein at least a portion of the one or more short-circuit prevention members is disposed between two electrically conductive connectors adjacent to each other among the plurality of electrically conductive connectors.

6. The battery module of claim 5, wherein the insulation cover is disposed to face the support frame, and wherein the insulation cover further includes an insertion groove into which at least a portion of the one or more short-circuit prevention members is inserted.

7. The battery module of claim 5, wherein the short-circuit prevention member is attached to the insulation cover.

8. The battery module of claim 5, wherein the support frame includes an accommodation groove in which at least a portion of the one or more short-circuit prevention members is accommodated.

9. The battery module of claim 1, wherein the one or more short-circuit prevention members include one or more first short-circuit preventing members and one or more second short-circuit prevention members, wherein at least a portion of the one or more first short-circuit preventing members is disposed between two electrically conductive connectors adjacent to each other among the plurality of electrically conductive connectors, and wherein at least a portion of the one or more second short-circuit prevention members penetrates through the plurality of electrically conductive connectors.

10. The battery module of claim 9, wherein the one or more first short-circuit prevention members and the one or more second short-circuit prevention members are alternately arranged in the direction of gravity in which the plurality of battery cells are stacked.

11. The battery module of claim 1, wherein at least one of the plurality of battery cells includes a lead tab, wherein at least one of the plurality of electrically conductive connectors includes a slit opening, and wherein the lead tab is inserted to the slit opening and is electrically connected to at least one of the plurality of electrically conductive connectors.

12. The battery module of claim 1, wherein at least one of the plurality of battery cells includes a lead tab electrically connected to at least one of the plurality of electrically conductive connectors, and wherein at least a portion of the lead tab is bent toward a surface of at least one of the plurality of electrically conductive connectors.

* * * * *